United States Patent
Kreiger et al.

(10) Patent No.: US 10,478,276 B2
(45) Date of Patent: Nov. 19, 2019

(54) PELLET DELIVERY MECHANISM

(71) Applicants: World Wildlife Fund, Inc., Washington, DC (US); Government of the United States of America, as Represented by the U.S. Department of the Interior, Fish and Wildlife Service, Washington, DC (US)

(72) Inventors: Kurt Edward Kreiger, Billings, MT (US); Marc Randolph Matchett, Lewistown, MT (US)

(73) Assignees: World Wildlife Fund, Inc., Washington, DC (US); United States Department of the Interior, Fish and Wildlife Service, Washington, DC (US)

( * ) Notice: Subject to any disclaimer, the term of this patent is extended or adjusted under 35 U.S.C. 154(b) by 115 days.

(21) Appl. No.: 15/675,630

(22) Filed: Aug. 11, 2017

(65) Prior Publication Data
US 2019/0046311 A1    Feb. 14, 2019

(51) Int. Cl.
*A61D 7/00* (2006.01)
*B65D 83/04* (2006.01)

(52) U.S. Cl.
CPC ........... *A61D 7/00* (2013.01); *B65D 83/0409* (2013.01)

(58) Field of Classification Search
None
See application file for complete search history.

(56) References Cited

U.S. PATENT DOCUMENTS

| | | | | |
|---|---|---|---|---|
| 3,907,100 A | * | 9/1975 | Ranford | B65B 35/00 198/350 |
| 4,687,465 A | * | 8/1987 | Prindle | A61M 37/0069 124/45 |
| 6,581,535 B2 | * | 6/2003 | Barry | A01C 7/127 111/181 |
| 7,757,835 B2 | * | 7/2010 | Garthaffner | A24D 3/0216 198/392 |

(Continued)

OTHER PUBLICATIONS

Auto Magazine. (Dec. 13, 2017). "Biologists are Saving Ferrets With a Help of a Pellet-Dropping Drone," located at: http://automagazine.info/news/biologists-are-saving-ferrets-with-the-help-of-a-pellet-dropping-drone/, last visited on Jun. 22, 2018, two pages.

(Continued)

*Primary Examiner* — Jacob S. Scott
*Assistant Examiner* — Ayodeji T Ojofeitimi
(74) *Attorney, Agent, or Firm* — Morrison & Foerster LLP

(57) ABSTRACT

Pellet delivery systems capable of reliably and precisely delivering pellets over a large area are disclosed. In some examples, the system can deliver one or more pellets in one delivery cycle using a slide chamber. In other examples, the system can deliver one or more pellets per delivery cycle using a rotating disk comprising one or more holes. In any of these examples, the system can eject the pellets using a projector and/or gravity. The pellet delivery system can, in various examples, be utilized in conjunction with a carrier such as an airborne, terrestrial or aquatic vehicle, or in other examples with a human or animal carrier. Examples of the disclosure are also directed to precise pellet delivery based on the location of the pellet deliver system, pellet delivery tracking, adjusting pellet delivery, and determining paths for efficient pellet delivery.

20 Claims, 21 Drawing Sheets

(56) References Cited

U.S. PATENT DOCUMENTS

| | | | | |
|---|---|---|---|---|
| 7,896,195 | B2* | 3/2011 | Limback | A47L 15/4409 221/263 |
| 9,320,877 | B2* | 4/2016 | Imran | A61M 31/002 |
| 9,500,435 | B2* | 11/2016 | Tseng | F41B 11/53 |
| 2004/0074487 | A1* | 4/2004 | Christopher | F41B 11/53 124/56 |
| 2004/0099676 | A1* | 5/2004 | Anderson | A61M 15/0045 221/25 |
| 2007/0108223 | A1* | 5/2007 | Behrens | G07F 11/44 221/263 |
| 2008/0230556 | A1* | 9/2008 | Kroupa | B65D 25/22 221/256 |
| 2013/0256330 | A1* | 10/2013 | Wang | B65D 83/0409 221/1 |
| 2013/0320033 | A1* | 12/2013 | Brug | B65H 3/00 221/265 |
| 2017/0174343 | A1* | 6/2017 | Erickson | G16H 50/20 |
| 2018/0201372 | A1* | 7/2018 | Miller | B05B 7/12 |
| 2018/0354624 | A1* | 12/2018 | Liu | B64D 1/18 |

OTHER PUBLICATIONS

Brulliard, K. (Jul. 15, 2016). "Drone-fired peanut butter pellets: A government plan to save endangered ferrets," The Washington Post, Journal Star, http://www.pjstar.com/zz/shareable/20160715/drone-fired-peanut-butter-pellets-government-plan-to-save-endangered-ferrets, last visited on Jun. 21, 2018, three pages.

Brulliard, K. (Oct. 24, 2016). "Watch peanut butter drone strikes that could save endangered ferrets," The Washington Post, located at: https://www.washingtonpost.com/news/animalla/wp/2016/10/24/watch-peanut-butter-drone-strikes-that-couid-save-endangered-ferrets/?noredirect=on&utm_term=.ece2451b40b8, last visited on Jun. 21, 2018, two pages.

CNN Wires. (Oct. 26, 2016). "Here's how peanut butter snack may save endangered ferrets," FOX 2, located at: http://fox2now.com/2016/10/26/heres-how-peanut-butter-snack-may-save-endangered-ferrets/, last visited on Dec. 18, 2018, nine pages.

French, B. (Dec. 15, 2016). "Delivering vaccine to prairie dogs requires creative thinking," Billings Gazette, located at: http://billingsgazette.com/lifestyles/recreation/delivering-vaccine-to-prairie-dogs-requires-creative-thinking/article_12246948-9c4f-5f0a-8c2c-2a5f2a77014c.html, last visited on Dec. 10, 2018, nine pages.

Hegyi, N. (Dec. 10, 2017). "Biologists With Drones and Peanut Butter Pellets are on a Mission to Help Ferrets," Yellowstone Public Radio, NPR, https://www.npr.org/2017/12/10/569468426/biologists-with-drones-and-peanut-butter-pellets-are-on-a-mission-to-help-ferret, last visited on Dec. 18, 2018, twelve pages.

Hegyi, N. (Sep. 14, 2017). "How Drones and Peanut Butter Are Saving Nation's Most Endangered Mammal," Montana Public Radio, located at: http://mtpr.org/post/how-drones-and-peanut-butter-are-savinq-nations-most-endangered-mammal, last visited on Jun. 22, 2018, eight pages.

Heigl, A. (Oct. 20, 2016). "Please Enjoy This Beautiful B-Roll of U.S. Fish & Wildlife's Drone Vaccine Program," People, located at: https://people.com/pets/b-roll-of-u-s-fish-wildlifes-drone-vaceine-program/, last visited on Jun. 21, 2018, one page.

land.com Network. (Oct. 21, 2016). "Tech We Like: Drones to the Rescue! Drones in Use to Protect Black-footed Ferrets," located at: https://www.land.com/news/tech-we-like-black-footed-ferret-vaccine-drones/, last visited on Jun. 21, 2018, seven pages.

Life Gone Wild. (Jan. 18, 2018). "How a Species Comes Back from the Brink of Extinction (Twice)!," located at: https://www.lifegonewild.org/mywildlife/2018/1/18/brink-of-extinction, last visited on Jun. 22, 2018, sixteen pages.

Margaritoff, M. (Dec. 13, 2017). "Biologists are Saving Ferrets With the Help of a Pellet-Dropping Drone," The Drive, located at: http://www.thedrive.com/aerial/16921/biologists-are-saving-ferrets-with-the-help-of-a-pellet-dropping-drone, last visited on Jan. 2, 2019, four pages.

Milman, O. (Jul. 12, 2016). "Drones to unleash vaccine-laced pellets in bid to save Endangered ferrets," The Guardian, located at: https:www.theguardian.com/environment/2016/jul/12/us-government/black-footed-ferret-mandm-vaccines, last visited on Jun. 21, 2018, four pages.

Mok, K. (Jul. 30, 2016). "'Glorified Gumball Machines' to Airdrop Vaccine Pellets for Endangered Ferrets," The New Stack, https://thenewstack.lo/glorified-gumball-machine-drones-airdrop-vaccine-pellets-endangered-ferrets/, last visited on Jun. 21, 2018, nine pages.

Morse, S. (Jul. 5, 2017). "Another Chance for Ferrets," U.S. Fish & Wildlife Service, located at: https://www.fws.gov/refuges/features/Ferrets.html, last visited on Jun. 22, 2018, thirteen pages.

Mountain West News. (Sep. 15, 2017). "Drones help masked bandits of the prairie," located at: https://mountainwestnews.org/drones-help-masked-bandits-of-the-prairie-9123e2b8a516, last visited on Jun. 22, 2018, twelve pages.

Murison, M. (Dec. 12, 2017). "Drones, Peanut Butter Vaccines and Endangered Ferrets," DroneLife, located at: https://dronelife.com/2017/12/12/drones-peanut-butter-vaccines-ferrets/, last visited on Dec. 10, 2018, four pages.

NPR. (Dec. 12, 2017). "Biologists With Drones and Peanut Butter Pellets Are on a Mission to Help Ferrets," 51En.Com, located at: http://www.51en.com/news/npr/23407.html, last visited on Jun. 22, 2018, four pages.

Peters, A. (Jul. 20, 2016). "Wildlife Officials Want to Use Drones to Shoot Peanut Butter Snacks at Prairie Dogs," Fast Company, located at: https://www.fastcompany.com/3061955/wildlife-officials-want-to-use-drones-to-shoot-peanut-butter-snacks-at-prairie-dogs, last visited on Jan. 4, 2019, fifteen pages.

Rauber, P. (Oct. 28, 2016) "Can Peanut Butter Treats Delivered by Drone Save the Black-Footed Ferret?" Sierra Magazine, located at: https://www.sierraclub.org/sierra/green-life/can-peanut-butter-treats-delivered-drone-save-black-footed-ferret , last visited on Jun. 21, 2018, five pages.

Rowe, A. (Dec. 13, 2017). "Drones Are Now Vaccinating Prairie Dogs and Documenting Moose," TechCo, located at: https://tech.co/drones-now-vaccinating-prairie-dogs-documenting-moose-2017-12, last visited on Jun. 22, 2018, four pages.

Wade, S. (Sep. 2, 2015). "Prairie Dogs, Black-Footed Ferrets, and a Pilotless Plane: An innovative boost for black-footed ferrets," World Wildlife Fund, located at: https://www.worldwildlife.org/stories/prairie-dogs-black-footed-ferrets-and-a-pilot-less-plane, last visited on Dec. 10, 2018, nine pages.

World Wildlife Fund. (Oct. 18, 2016). "Innovations (and peanut butter) give black footed ferrets a boost," located at: https://worldwildlife.org/stories/innovations-and-peanut-butter-give-black-footed-ferrets-a-boost, last visited on Jun. 21, 2018, three pages.

World Wildlife Fund/Conservation Media, (Oct. 26, 2016). "Drones and peanut butter used to save endangered animal," CNN, located at: https://www.cnn.com/videos/living/2016/10/26/drone-peanut-butter-pellets-endangered-ferret-montana-bts.world-wildlife-fund-conservation-media, last visited on Jun. 21, 2018, five pages.

WYO4NEWS Inc. (Oct. 19, 2016). "Partnerships, Innovation (and Peanut Butter) Give New Hope for America's Most Endangered Mammal," located at: https:wyo4news.com.news/partnerships-innovation-peanut-butter-give-new-hope-americas-endangered-mammal/, last visited on Jun. 21, 2018, six pages.

* cited by examiner

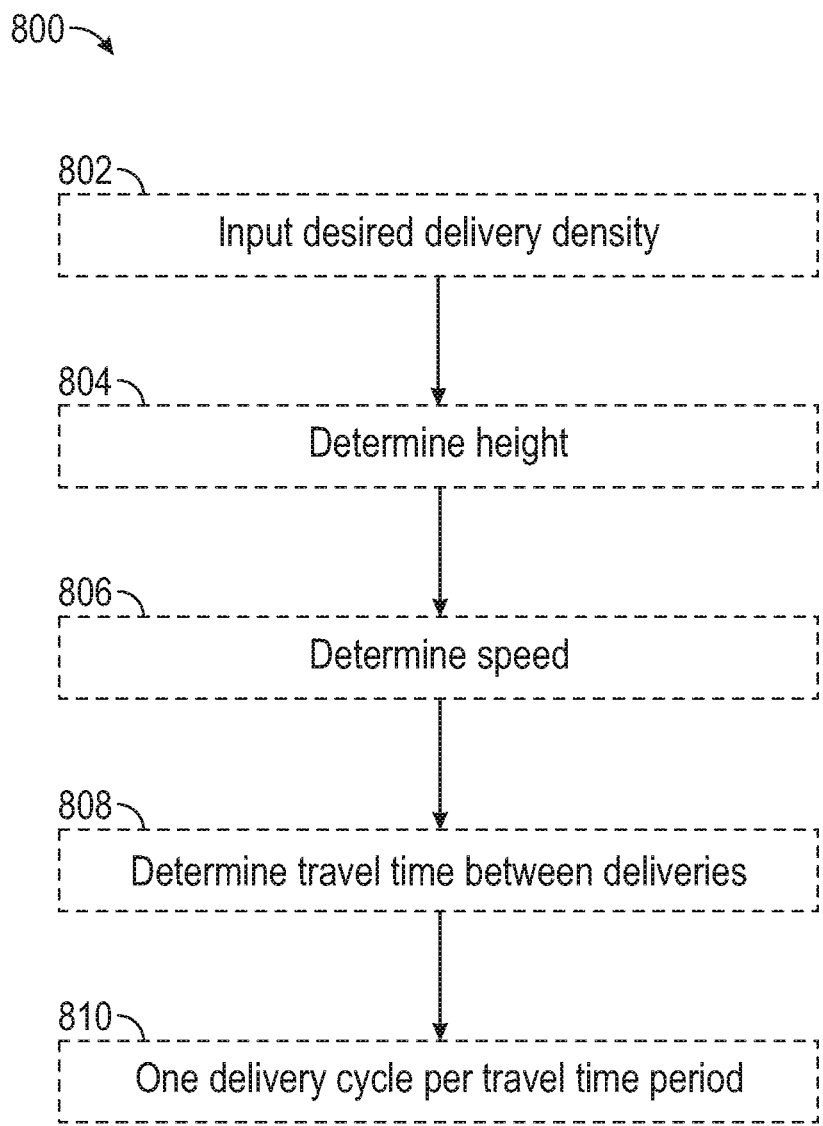

PELLET DELIVERY MECHANISM

ORIGIN OF INVENTION

The invention described herein was made by an employee of the United States Government and may be manufactured and used by or for the Government, for Government purposes, without payment of any royalties thereon or therefore.

FIELD OF THE DISCLOSURE

This relates generally to pellet delivery mechanisms, and more particularly to pellet delivery systems that are capable of reliably and precisely delivering pellets over a large area.

BACKGROUND OF THE DISCLOSURE

The North American Great Plains supports a complex and fragile prairie ecosystem. When healthy, the prairie ecosystem is able to support many unique plants and animals. One such animal is the black-footed ferret (*Mustela nigripes*). It is the only ferret native to North America, and is an important component of the Great Plains prairie ecosystem. Its presence is an indicator of a healthy habitat. However, the black-footed ferret is endangered, with as little as an estimated 300 left in the wild. Conservation of the black-footed ferret is critical to the health of the Great Plains prairie ecosystem.

Prairie dogs (*Cynomys* spp.) comprise about 90% of the black-footed ferret's diet. Both black-footed ferrets and prairie dogs are highly susceptible to sylvatic plague, a disease in which both animals have little natural immunity. Plague is one of the biggest obstacles to ferret recovery because it can curtail access to a reliable food source. To prevent prairie dog populations from diminishing due to a plague outbreak, and to ensure a reliable food source for black-footed ferrets, researchers have developed an oral vaccine to protect the prairie dogs from sylvatic plague. The vaccine can be delivered in the form of a small pellet. Along with the vaccine, the pellets can also include attractants such as peanut butter to entice prompt consumption by prairie dogs. While the development of the oral vaccine has been highly successful in a confined area (e.g., in a laboratory setting, or less than a 50-acre area), a reliable and precise mechanism and method is needed to distribute the vaccine pellets on a broader scale and ensure success of the vaccine over a large area such as the black-footed ferret's habitat.

In addition to delivering the vaccine, systemic flea control products can also be delivered via a pellet in a similar fashion as the vaccine. Fleas are a vector for spreading plague, and flea control has been shown to reduce the effects of plague. Such oral delivery of flea and tick control products are widespread in the domestic pet industry. Fleas that feed on a prairie dog that has consumed one of these pellets with a systemic flea control product are likely to die.

SUMMARY OF THE DISCLOSURE

Examples of the disclosure are directed to pellet delivery systems that are capable of reliably and precisely delivering pellets over a large area (e.g., thousands of acres at individual sites, and hundreds of thousands of acres collectively over numerous sites). In some examples, the system can deliver one or more pellets in one delivery cycle using a slide chamber. In other examples, the system can deliver one or more pellets per delivery cycle using a rotating disk comprising one or more holes. In any of these examples, the system can eject the pellets using a projector and/or gravity. The pellet delivery system can, in various examples, be utilized in conjunction with a carrier such as an airborne, terrestrial or aquatic vehicle, or in other examples with a human or animal carrier. Examples of the disclosure are also directed to precise pellet delivery based on the location of the pellet deliver system, pellet delivery tracking, adjusting pellet delivery, and determining paths for efficient pellet delivery.

Although examples of the disclosure may be described, at times, in the context of vaccine pellets for prairie dogs, it should be understood that the examples of the disclosure are not so limited, but extend to pellet delivery systems for other purposes wherein the reliable and precise delivery of pellets over a large area is needed, including pellet delivery for nutritional purposes, plant fertilization, or animal population protection or vegetation control.

BRIEF DESCRIPTION OF THE DRAWINGS

FIG. 8A illustrates a method of pellet delivery according to examples of the disclosure.

FIG. 8B illustrates another method of pellet delivery according to examples of the disclosure.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples. Although example pellet delivery systems may be shown in some instances with various example structural features for purposes of completeness, or in other instances without various structural features for purposes of clarity and avoiding clutter, it should be understood that the presence or absence of these features is not to be construed as limiting the illustrated examples. It should also be understood that the drawings are not proportional and not to scale.

Examples of the disclosure are directed to pellet delivery systems that are capable of reliably and precisely delivering pellets over a large area (e.g., thousands of acres at individual sites, and hundreds of thousands of acres collectively over numerous sites). In some examples, the system can deliver one or more pellets in one delivery cycle using a slide chamber. In other examples, the system can deliver one or more pellets per delivery cycle using a rotating disk comprising one or more holes. In any of these examples, the system can eject the pellets using a projector and/or gravity. The pellet delivery system can, in various examples, be utilized in conjunction with a carrier such as an airborne, terrestrial or aquatic vehicle, or in other examples with a human or animal carrier. Examples of the disclosure are also directed to precise pellet delivery based on the location of the pellet deliver system, pellet delivery tracking, adjusting pellet delivery, and determining paths for efficient pellet delivery.

Although examples of the disclosure may be described, at times, in the context of vaccine pellets for prairie dogs, it should be understood that the examples of the disclosure are not so limited, but extend to pellet delivery systems for other purposes wherein the reliable and precise delivery of pellets over a large area is needed, including pellet delivery for nutritional purposes, plant fertilization, or animal population protection or vegetation control.

Figure 1A:
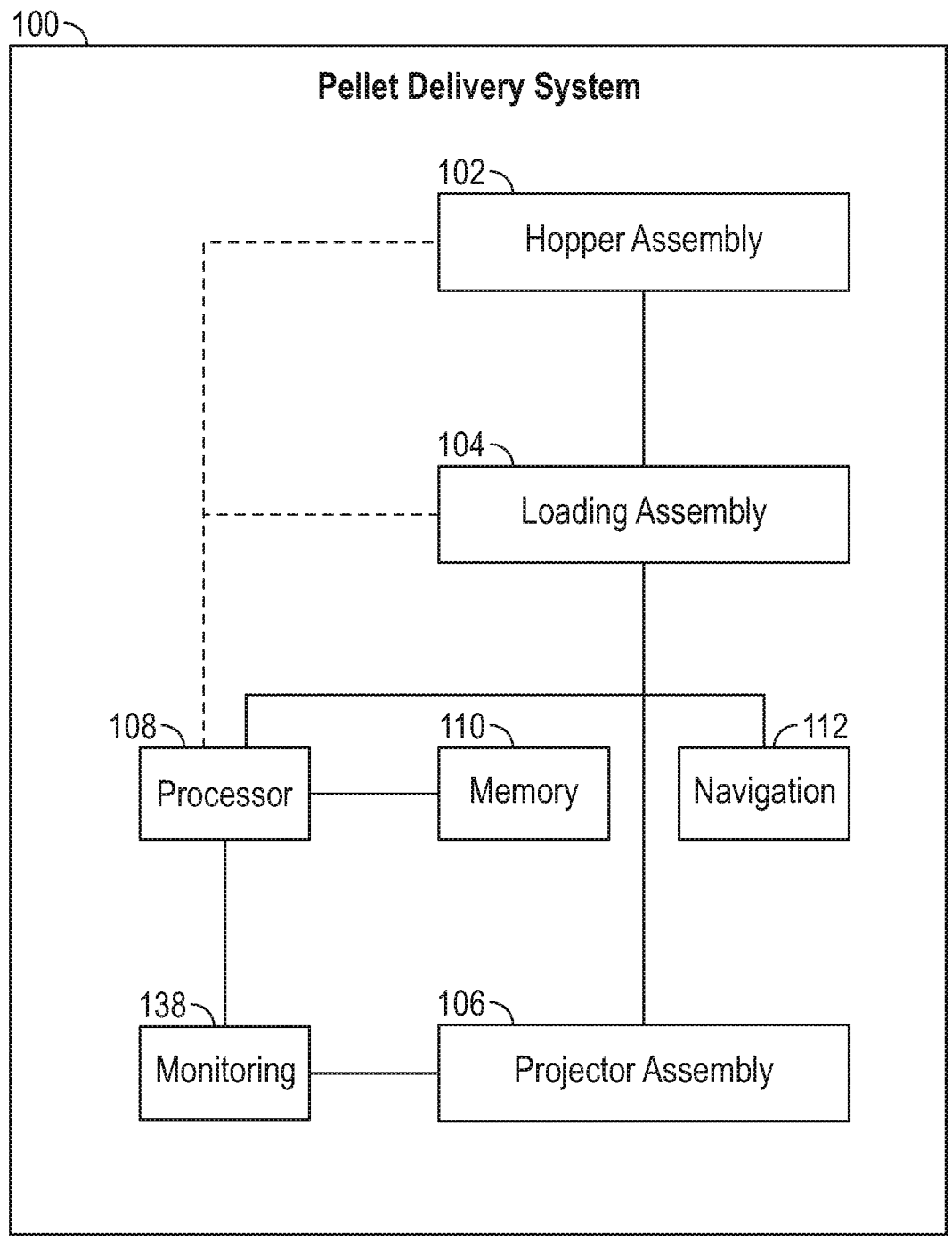
FIG. 1A is a functional block diagram of a pellet delivery system according to examples of the disclosure.

FIG. 1A is a functional block diagram of a pellet delivery system 100 according to examples of the disclosure. The exemplary pellet delivery system 100 (i.e., apparatus) can include, but is not limited to, a hopper assembly 102, a loading assembly 104, and a projector assembly 106. The hopper assembly 102 can store pellets prior to queueing of the pellets in the loading assembly 104. The size of hopper assembly 102 can be a function of the number of pellets capable of being distributed by the pellet delivery system 100 during a single excursion, wherein the excursion time can be dependent on the properties of the carrier for the system (e.g., communication range, battery life, fuel, treatment area, etc.). In some examples, the hopper assembly 102 can stir, agitate, separate or otherwise engage the stored pellets to ensure consistent pellet queueing into the loading assembly 104. The loading assembly 104 can be configured to continuously or periodically load the queued pellets into the projector assembly 106. The organization and queueing of pellets within the loading assembly 104 can help to ensure that pellets are properly loaded into the projector assembly 106. Proper loading can ensure that the projector assembly 106 dispenses the proper number of pellets during a single delivery cycle. The projector assembly 106 can eject one or more of the loaded pellets from the pellet delivery system via one or more delivery exits in the projector assembly during each delivery cycle. A delivery cycle can be defined by a time period in which consecutive pellets from a respective delivery exit are ejected.

Pellet delivery system 100 can also include one or more processors 108, memory 110, navigation system 112, and monitoring system 138, which will be collectively referred to herein as the control system. Memory 110 can store programs to be executed by the processor 108, and can store collected data. Navigation system 112 (e.g., a flight controller) can determine the location of the pellet delivery system 100 using a global positioning system (GPS), for example. Monitoring system 138 can monitor various operations of the pellet delivery system 100, such as pellet exits, and capture dispensing and error data.

Figure 1B:
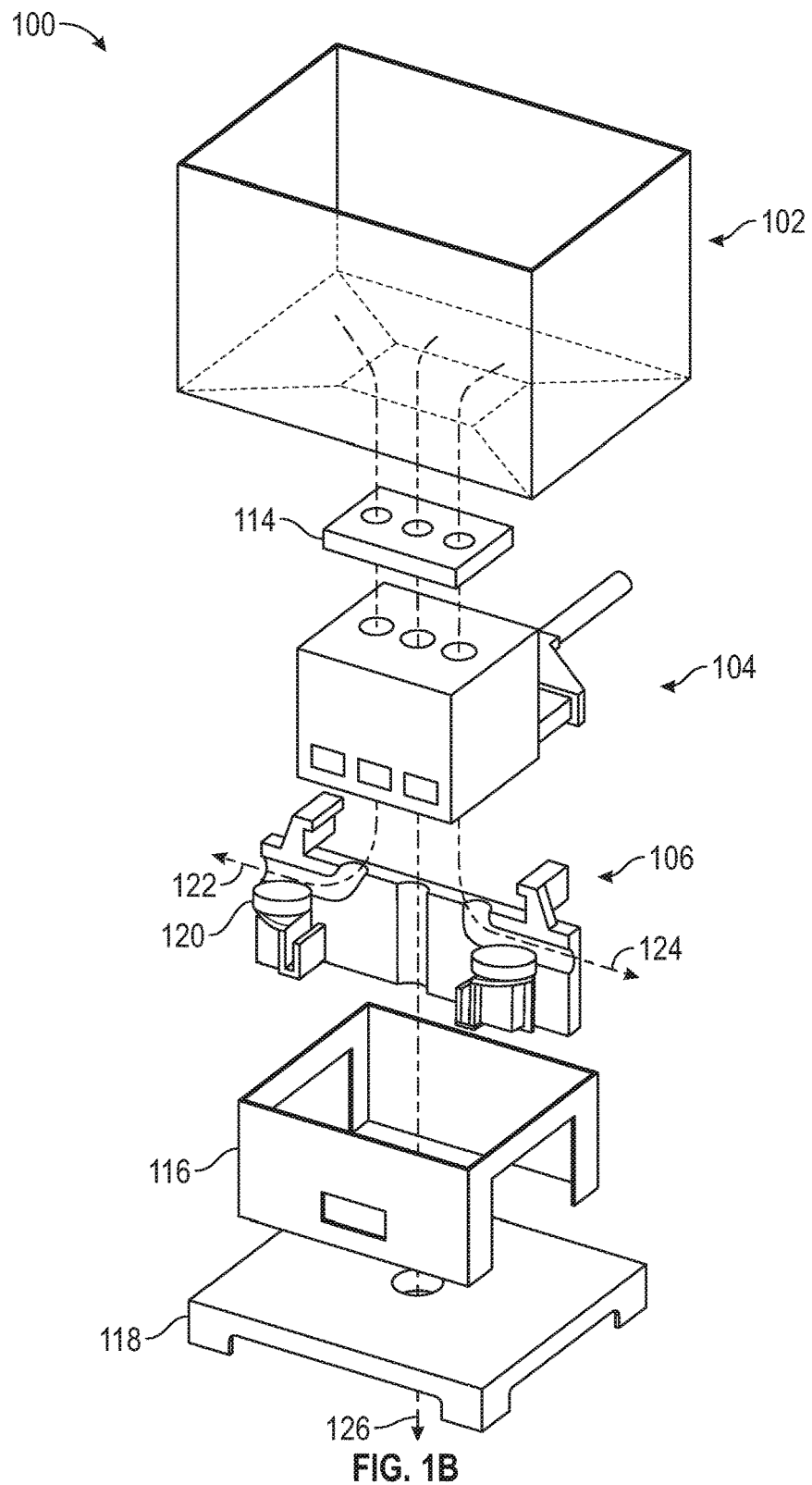
FIG. 1B is an exploded perspective view of a pellet delivery system according to examples of the disclosure.

FIG. 1B is an exploded perspective view of a pellet delivery system 100 according to examples of the disclosure. In the example of FIG. 1B, hopper assembly 102 can be coupled to loading assembly 104 using optional union 114, and the loading assembly can be attached to the top of projector assembly 106. In examples where pellet delivery system 100 is to be attached to a terrestrial carrier such as an ATV, loading assembly 104 and projector assembly 106 can be housed in chassis 116, and the chassis can be mounted to base 118. Base 118 can then be mounted to the terrestrial carrier. In the example of FIG. 1B, a pellet originally stored in hopper assembly 102 can pass through apertures in union 114, become queued within loading assembly 104, loaded into projector assembly 106, and get ejected from the projector assembly using two spinning projection wheels 120, as indicated by path 122. It should be noted that FIG. 1B only shows one-half of the chassis of projector assembly 106 and only one spinning projection wheel 120 for path 122 so that the tubular passages within the chassis can be exposed for purposes of explanation and clarity. In addition, although FIG. 1B contemplates two projection wheels 120 is a side-by-side configuration for each path, in other examples the projection wheels can be oriented in other configurations, such as a top-bottom configuration. Furthermore, although a projection wheel mechanism is illustrated in the example of FIG. 1B, other projection mechanisms and techniques, such as compressed air, spring-loaded catapults, rotating flippers and the like may also be employed. Another pellet can also progress through the pellet delivery system 100 in a similar manner, as indicated by path 124. Yet another pellet originally stored in hopper assembly 102 can pass through apertures in union 114, become queued within loading assembly 104, loaded into projector assembly 106, and get released from the projector assembly using only gravity, as indicated by path 126.

In the example of FIG. 1B, pellet delivery system 100 can dispense three pellets during each delivery cycle. However, in other examples, pellet delivery system 100 can dispense only one pellet via any one of paths 122, 124 or 126 and accompanying mechanisms, or two pellets via any two of paths 122, 124 or 126 and accompanying mechanisms. In some examples, the pellet delivery system 100 can be attached to an airborne carrier such as an unmanned aerial vehicle (UAV) (e.g., quadcopter, helicopter, fixed wing aircraft and the like) or a manned aerial vehicle for delivery of pellets from the air. In these examples, the pellet delivery system 100 can attach to the airborne carrier via hopper assembly 102 (although other attachment mechanisms are contemplated), and chassis 116 and base 118 can be removed to save weight. In other examples, the pellet delivery system 100 can be attached to terrestrial carriers such as an all-terrain vehicle (ATV), truck, motorcycle and the like for delivery of pellets from ground level. In these examples, the pellet delivery system 100 can be attached to the terrestrial carrier via base 118 (although other attachment mechanisms are contemplated). In still other examples, the pellet delivery system 100 can be attached to a human or animal using a harness.

Figure 1C:
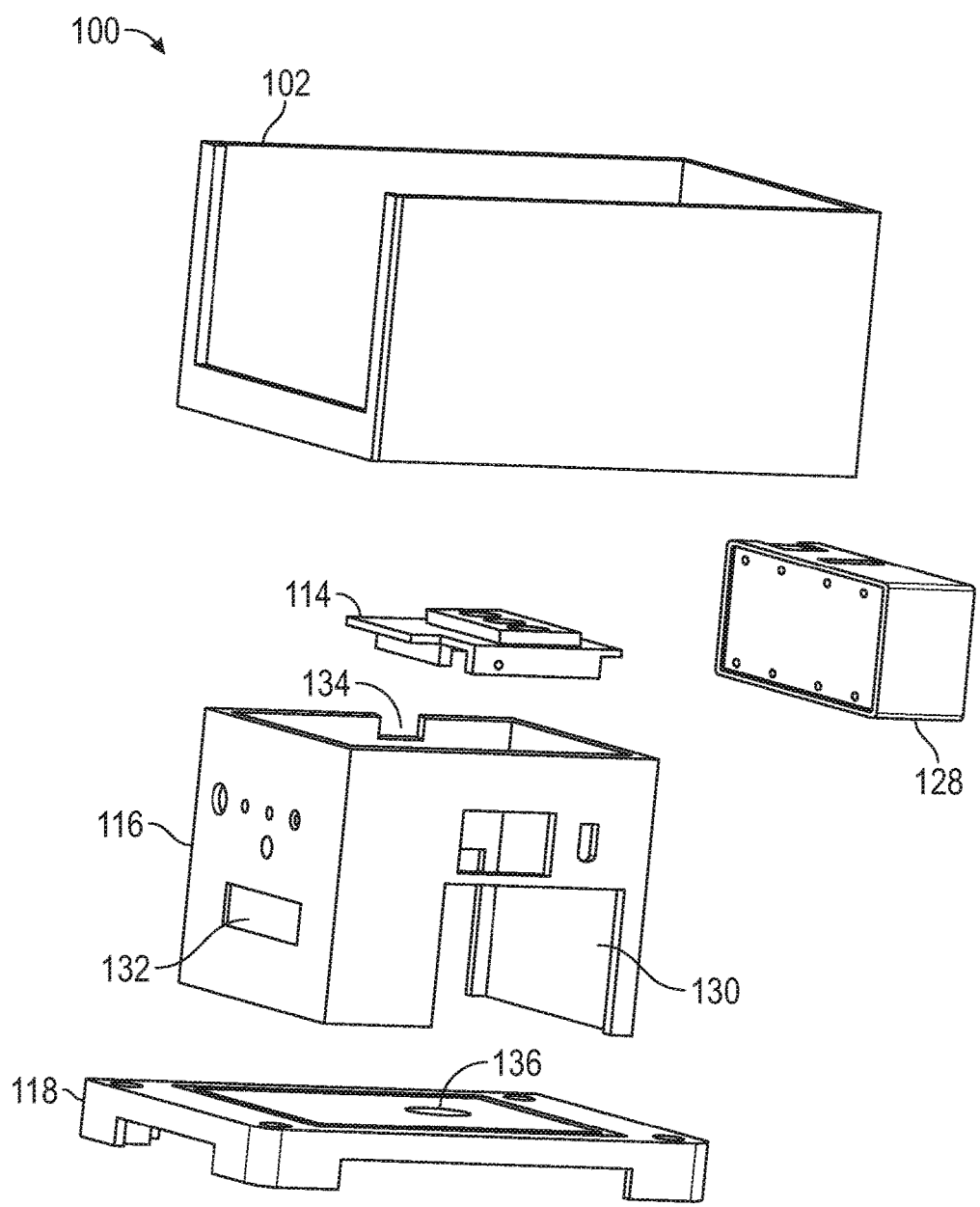
FIG. 1C is another exploded perspective view of various components of a pellet delivery system according to examples of the disclosure.

FIG. 1C is another exploded perspective view of various components of a pellet delivery system according to examples of the disclosure. In the example of FIG. 1C, hopper assembly 102 is represented in a simplified manner, while additional exemplary detail is provided for union 114, chassis 116, and base 118. In addition, battery holder 128 is shown, which in some examples can be attached to the outside of chassis 116. However, in other examples, power can be provided to pellet delivery system 100 from a source external to the system, such as from the carrier. Chassis 116 can include one or more openings 130 for enabling pellets to be ejected from the projector assembly, and can include an input/output (I/O) opening 132 for a display and/or I/O device such as a touchscreen. In some examples with a servo motor located near the bottom of the hopper assembly, a servo cutout 134 may be needed to provide space and/or access for the servo motor. In some examples, base 118 can have an opening 136 to provide a gravitational exit for the projector assembly.

Figure 2A:
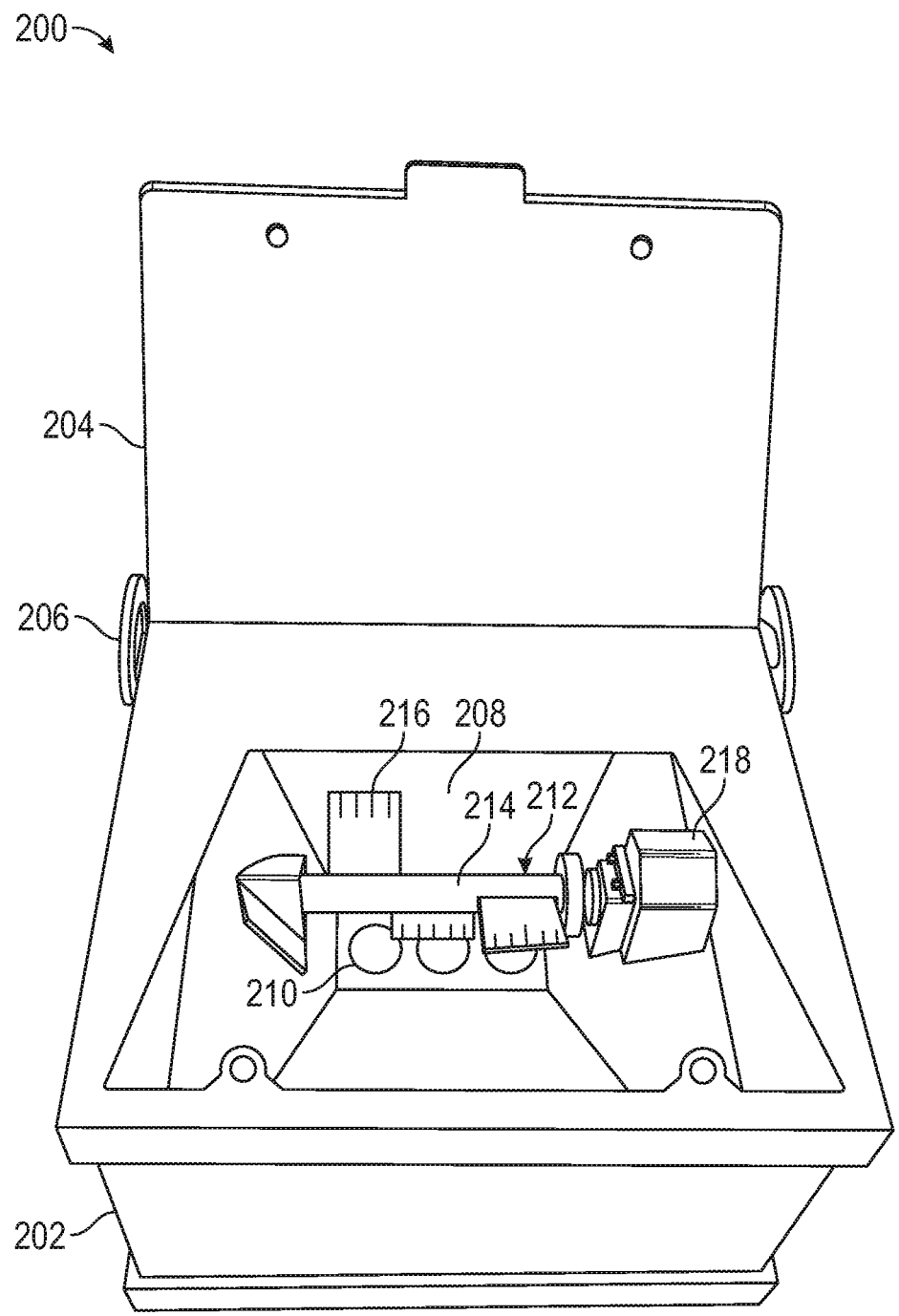
FIG. 2A is a top perspective view of a hopper assembly according to examples of the disclosure.

FIG. 2A is a top perspective view of a hopper assembly 200 according to examples of the disclosure. In the example of FIG. 2A, hopper assembly 200 can include a storage receptacle 202 and lid 204, which can, in some examples, be attached together via a hinging mechanism 206. Although storage receptacle 202 is generally rectangular in the illustration, a person of ordinary skill in the art would appreciate that the storage receptacle can be in any desired shape. One or more walls or storage receptacle 202 can be fully or partially transparent for visual access to the contents of the receptacle. Storage receptacle 202 can have an opening 208 for receiving pellets. In some examples, storage receptacle 202 can include a sloped bottom surface. The bottom surface of storage receptacle 202 can include an aperture for receiving at least a portion of an optional union (see reference character 114 in FIG. 1C), which itself can include one or more exit holes 210 for receiving pellets. In other examples, the bottom of storage receptacle 202 can include an integrated surface including exit holes 210.

In some examples, hopper assembly 200 can include a stirring mechanism 212. Stirring mechanism 212 can include a rotatable shaft 214, upon which one or more paddles 216 can be affixed. In some examples, the paddles 216 can be oriented at 120 degree intervals with respect to each other, although other orientations are contemplated. Stirring mechanism 212 can stir or agitate the pellets within storage receptacle 202 using the one or more paddles 216 to provide consistent pellet loading into exit holes 210. In one embodiment, shaft 214 or stirring mechanism 212 can be periodically driven by a servo motor 218. In some examples, paddles 216 can rotate in one direction for a first period of time (e.g., five seconds), and then rotate in the other direction for a second period of time. Pellet agitation can be beneficial because in some examples, the pellets are cylindrical in shape, and their flat surfaces can cause stiction when compressed. In addition, when pellets stored in the hopper assembly 200 are temporarily frozen to prevent the pellets from spoiling, they can get stuck together. Pellet agitation aids in the breaking apart of pellets that are stuck together. Although a specific stirring mechanism configuration and operation are described, a person of ordinary skill in the art will appreciate that other configurations and operations of the stirring mechanism 212 may exist without departing from the scope of the examples of the disclosure.

Figure 2B:
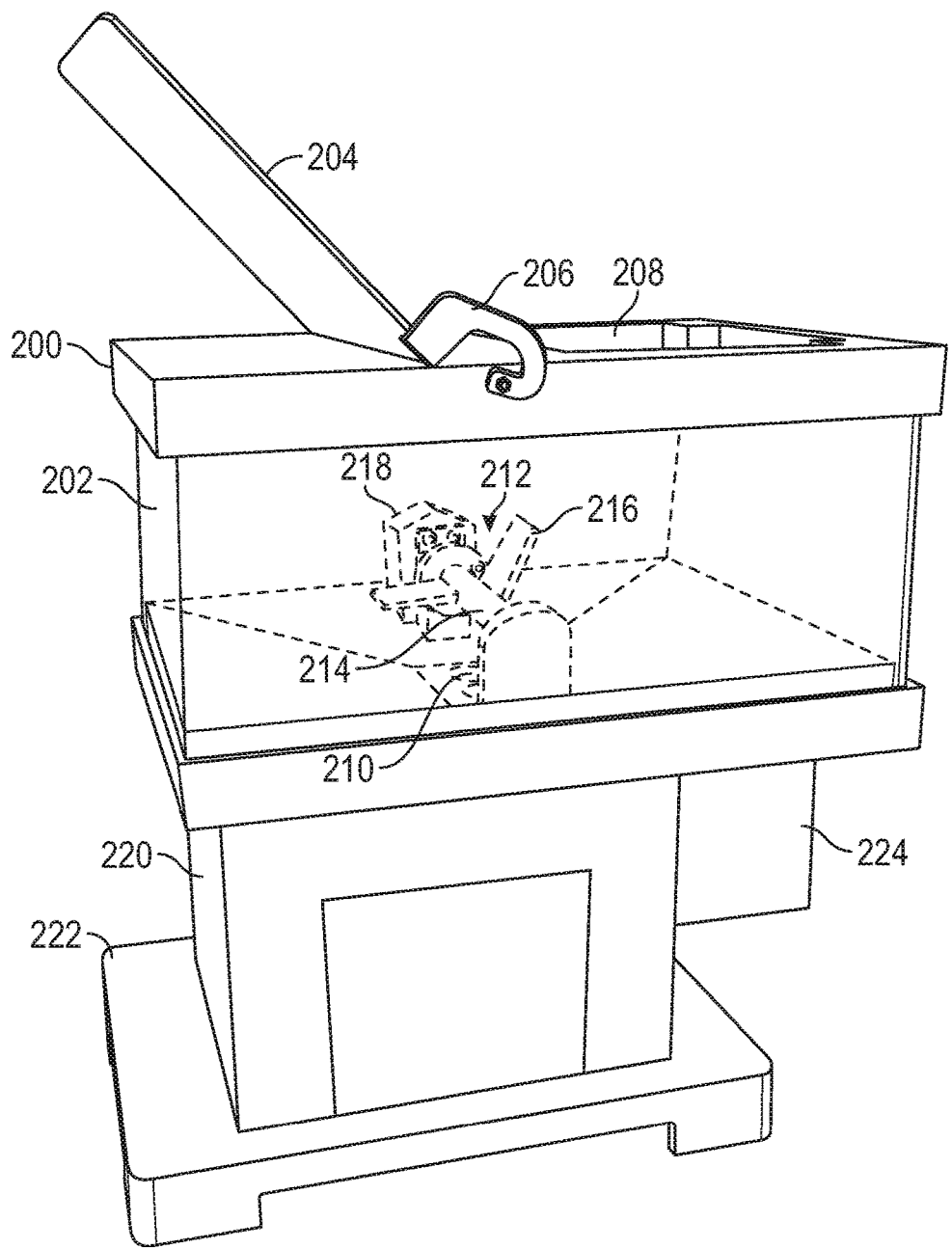
FIG. 2B is a side perspective view of a hopper assembly mounted to a chassis and base of the pellet delivery system according to examples of the disclosure.

FIG. 2B is a side perspective view of a hopper assembly 200 mounted to a chassis 220 and base 222 of the pellet delivery system according to examples of the disclosure. In the example of FIG. 2B, battery holder 224 is affixed to the side of chassis 220.

Figure 3A:
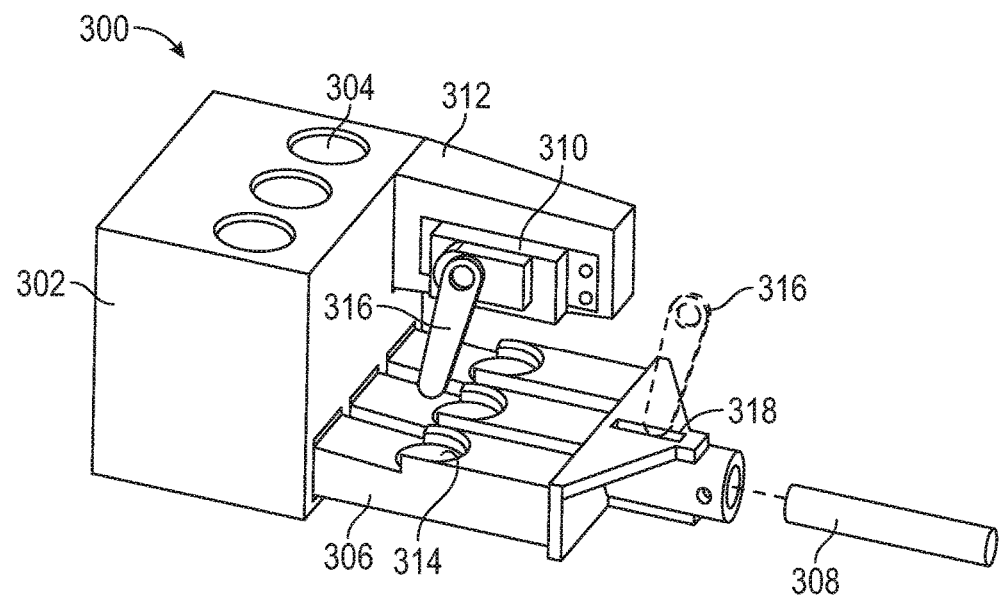
FIG. 3A is a perspective view of a loading assembly according to examples of the disclosure.

FIG. 3A is a perspective view of a loading assembly 300 according to examples of the disclosure. In the example of FIG. 3A, loading assembly 300 can include housing 302, one or more cylindrical tubes 304 for queueing pellets, drawer or slide chamber 306, slide chamber tube 308, servo motor 310, servo support bracket 312, one or more slide holes 314, and servo arm 316. Slide holes extend vertically through the entirety of slide chamber 306. It should be noted that slide chamber 306 is overextended out away from housing 306 only for the purpose of revealing slide holes 314—in operation, the slide chamber remains far enough into the housing that the slide holes are not exposed, and servo arm 316 is retained into slide slot 318 (as shown by servo arm appearing as dashed lines).

In operation, pellets from the hopper assembly can fall into and become queued within one or more tubes 304. The one or more tubes 304 can extend from a top surface of the housing 302 to the housing's interface with the slide chamber 306. In some examples, each tube 304 can hold a plurality of pellets (e.g., seven pellets) in a loading queue for eventual loading into the projector assembly. The length of the tube 304 and the queue of pellets within each tube can be beneficial because if a pellet does not fall into a tube, the loading assembly can have multiple delivery cycles in which to fill the tube with one or more pellets. Servo motor 310 can periodically drive the slide chamber 306 partially into and out of the housing 302 such that a pellet in each tube 304 falls into and is captured in each of the respective slide holes 314 when the slide holes line up with the tubes. After the slide chamber 306 changes direction, the slide holes 314 will eventually line up with exit holes (not shown in FIG. 3A) at the bottom of housing 302 that are offset with respect to tubes 304. When the slides holes 314 line up with the exit holes, the captured pellets in the slide holes will drop through the exit holes. In some examples, slide tube 308 can be connected to slide chamber 306 and protrude outside the loading assembly chassis via a hole, and as the slide moves in and out, the tube will move in and out, providing a visual aid for the operator and a confirmation that the slide chamber is working. The frequency at which the servo arm 316 completes one delivery cycle (one complete slide chamber motion cycle) to release one or more pellets can be controlled by a processor and, in some examples, be based on a precise location or on travel distance (e.g., how far the pellet delivery system has moved since the last release), which can be determined by a navigation system using GPS, for example. For example, it can be advantageous to complete one delivery cycle every 7-9 meters, so for a helicopter carrier traveling at 40 mph, one delivery cycle would need to be completed approximately every half second. In various examples, servo motor 310 can operate slide chamber 306 and release pellets based on trigger signals originating from the navigation system internal to the pellet delivery system, from the carrier itself (e.g., the flight management system of a UAV), or from a pilot or operator of the system via wireless signals (in terrestrial or airborne examples) or wired signals (in terrestrial examples) from a ground control station (GCS).

Figure 3B:
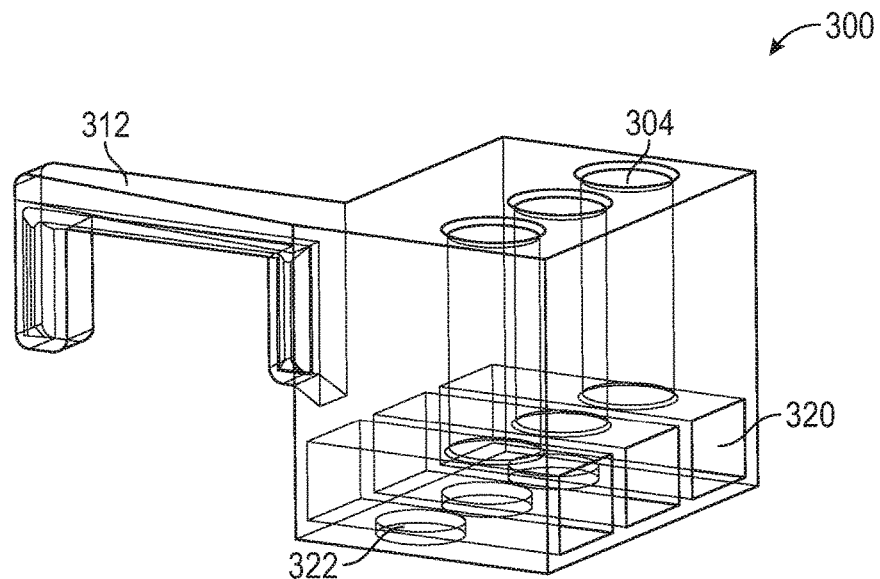
FIG. 3B is a perspective view of a loading assembly (from the opposite point of view as compared to FIG. 3A, and without the slide chamber or servo motor) showing hidden hollow areas according to examples of the disclosure.

FIG. 3B is a perspective view of a loading assembly 300 (from the opposite point of view as compared to FIG. 3A, and without the slide chamber or servo motor) showing hidden hollow areas according to examples of the disclosure. In the example of FIG. 3B, tubes 304 representing load queues terminate into chamber passageways 320, and exit holes 322 are offset with respect to tubes 304. It should be apparent from viewing FIGS. 3A and 3B together that a pellet can drop into slide hole 314 when the slide chamber 306 is positioned by the servo motor 310 such that the slide hole 314 aligns with tube 304. However, the pellet does not immediately exit loading assembly 300 because no exit hole exists directly under the tube. As the slide chamber 306 is repositioned by the servo motor 310, the pellet is transported within the slide hole 314 until it is aligned with exit hole 322. At that time, the pellet exits the loading assembly 300 via exit hole 322.

Figure 4A:
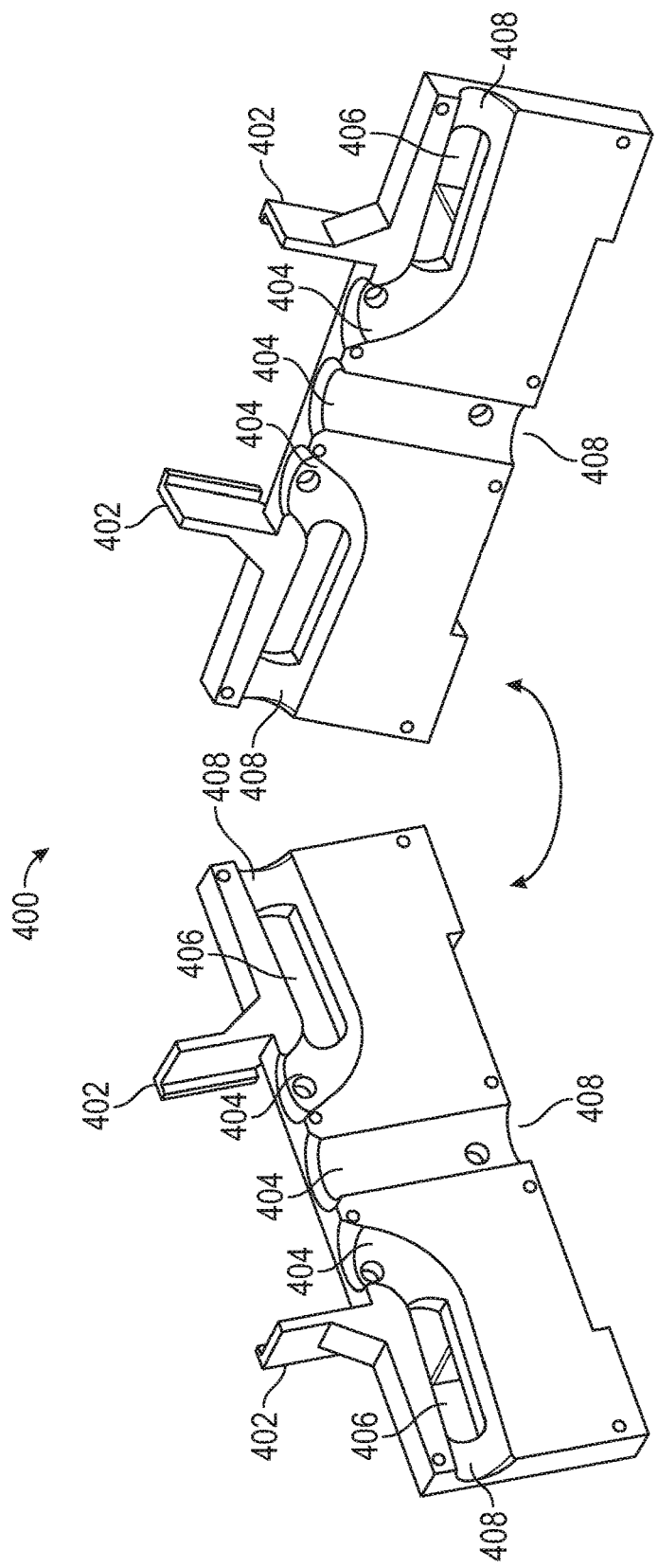
FIG. 4A provides perspective views of both halves of a projector assembly according to examples of the disclosure.

FIG. 4A provides perspective views of both halves of a projector assembly 400 according to examples of the disclosure. In the example of FIG. 4A, projector assembly 400 is formed in two halves for ease of manufacturing, but in other examples, the projector assembly can be formed as a single, continuous structure or in three or more separate structures. In examples where the projector assembly 400 is formed as separate structures, they can be attached to each other using conventional attachment hardware. Projector assembly 400 can include loading assembly mounting brackets 402, projector barrels 404, projection wheel slots 406, and delivery exits 408. Center delivery exit 408 can be located on the bottom surface of the projector assembly 400 such that pellets exiting the center delivery exit 408 can be dropped from the projector assembly through center projector barrel 404 using gravity. The side delivery exits 408 can be located on surfaces of the projector 400 assembly that are perpendicular to the bottom surface.

Figure 4B:
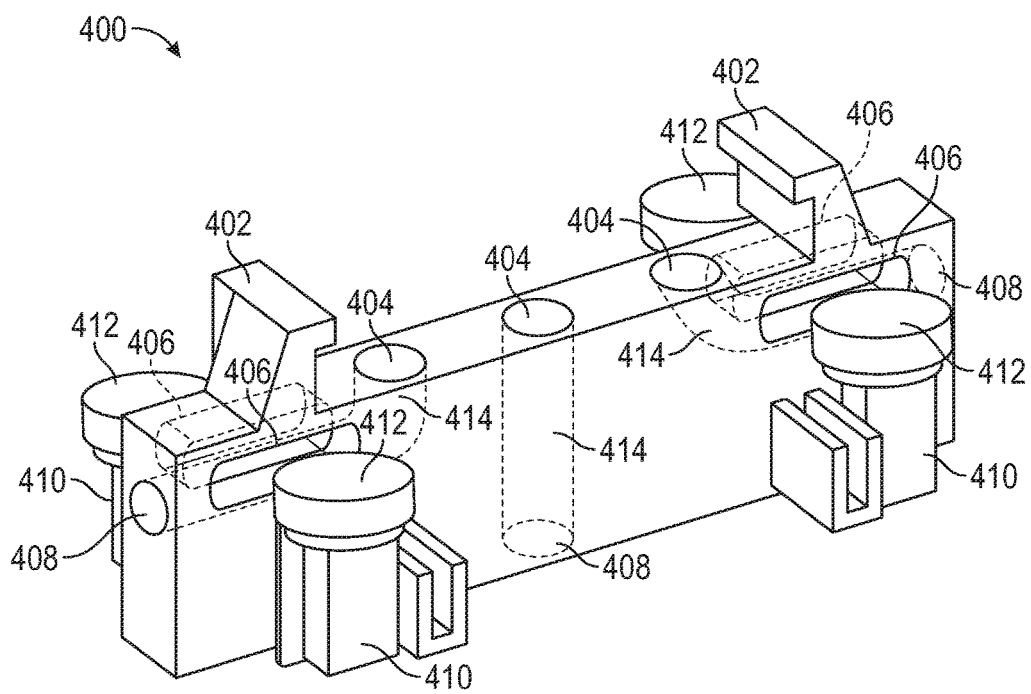
FIG. 4B is a perspective view of an assembled projector assembly according to examples of the disclosure.

FIG. 4B is a perspective view of an assembled projector assembly 400 according to examples of the disclosure. Attached to projector assembly 400 are servo motors 410, which drive projection wheels 412. Projection wheels 412 partially extend into projector barrels 404 via projection wheel slots 406. The projection wheels 412 can be controlled to rotate in the same direction (as seen by the projector barrels 404) to accelerate the pellets as the pellets traverse their respective projector barrels. The force applied by projection wheels 412 can be controlled by an input voltage, either at predetermined or dynamically adjustable levels, resulting in control over how fast the pellets exit the projector assembly 400 (i.e., velocity control), and ultimately, how far the pellets are projected away from the pellet delivery system. Although projection wheels 412 and servo motors 410 are used in the example of FIG. 4B, it should be understood that other projection mechanisms and techniques can also be employed.

In some examples, sensors 414 (e.g., infrared sensors) can be located near the entry points of barrels 404, or at other locations such as the center and side delivery exits 408, to monitor the pellets as they exit. Sensors 414 can be used to count exiting pellets, and if a pellet isn't detected by a sensor, an error count can be incremented, and an audible (e.g., buzzing) or visual (e.g., blinking light) alarm can be triggered to alert the operator. In some examples, feedback such as an audible or visible alarm can be activated when one or more pellets have not been delivered in each of a predetermined number of consecutive delivery cycles, which can be indicative of a jam or an empty hopper. Knowledge of pellet dispensing failures can be important, as there can often be a required number of pellets delivered per acre to ensure effective treatment.

Returning to FIGS. 1A and 1C, the pellet delivery system 100 can include processor/controller 108, memory 110, navigation system 112, and monitoring system 138. One or more of these systems can reside in chassis 116. Other components of the pellet delivery system 100 can include one or more I/O devices such as a display, buttons, touch pad or touch screen, a power button, and one or more cameras. The one or more cameras can provide the user with internal images or video of various operations such as the sliding chamber, or external images such as pellet landing locations and terrain. The processor/controller 108, in conjunction with the other systems, can be configured to determine different parameters of the pellet delivery system, such as delivery frequency, location, projection wheel acceleration, delivered pellet count, and sliding chamber performance.

Figure 5A:
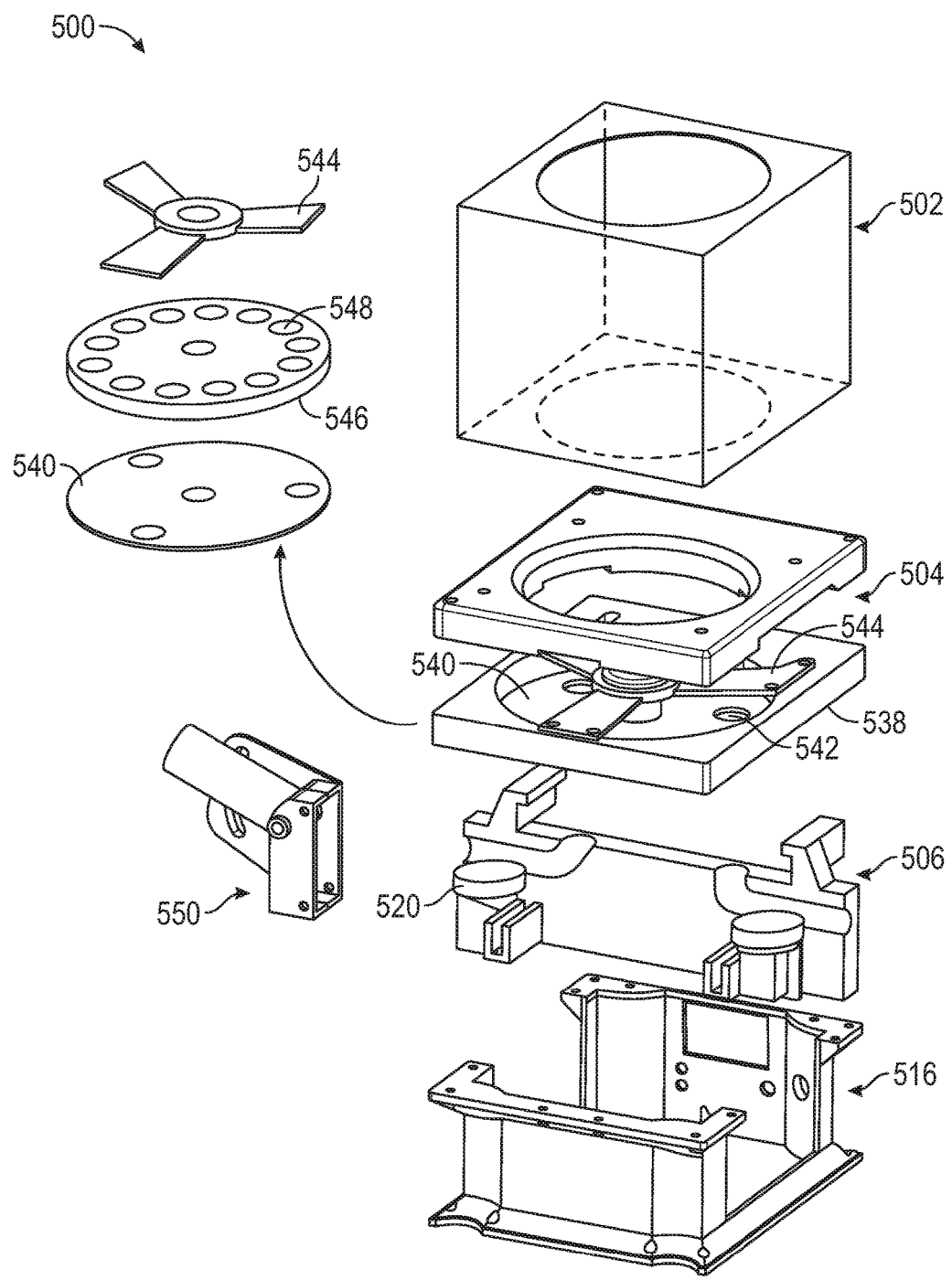
FIG. 5A provides an exploded perspective view of another pellet delivery system according to examples of the disclosure.

FIG. 5A provides an exploded perspective view of another pellet delivery system 500 (i.e., apparatus) according to examples of the disclosure. In the example of FIG. 5A, hopper assembly 502 can be coupled to loading assembly 504, and the loading assembly can be attached to the top of projector assembly 506. Loading assembly 504 can include loading tray 538 having a cylindrical recess 540 having three exit holes 542 covered vertically by scraper bars 544. Within recess 540, but below scraper bars 544, is a loading wheel (not shown at the right portion of FIG. 5A for purposes of clarity). At the upper left of FIG. 5A is an exploded view of loading assembly 504 which shows loading wheel 546 located between the bottom of recess 540 and below scraper bars 544. Loading wheel 546 can include a plurality of cylindrically shaped and vertically oriented loading holes 548. Depending on the number of exit holes 542 in loading tray 538, the loading holes 548 in loading wheel 546 function as one or more loading queues. In some examples, loading wheel 546 can be directly driven by a servo motor (not shown in FIG. 5A), although other drive mechanisms can also be employed.

In examples where pellet delivery system 500 is to be attached to a terrestrial carrier such as an all-terrain vehicle (ATV), loading assembly 504 and projector assembly 506 can be housed in chassis 516, and the chassis can then be mounted to the terrestrial carrier. In the example of FIG. 5A, a pellet originally stored in hopper assembly 502 can rest in loading holes 548 and become queued within loading assembly 504. As the loading wheel 546 is rotated by a servo motor, the loading holes will eventually align with exit holes 542 at the bottom of recess 540, at which time the pellets will exit the loading assembly via the exit holes, and enter projector assembly 506. Similar to the examples of FIG. 1B, in some examples pellets can be ejected from the left and right sides of the projector assembly 506 using two spinning projection wheels 520. It should be noted that FIG. 5A only shows one-half of the chassis of projector assembly 506 and only one spinning projection wheel 520 on each side so that the tubular barrels within the chassis can be exposed for purposes of explanation and clarity. Although a projection wheel mechanism is illustrated in the example of FIG. 5A, other projection mechanisms and techniques, such as compressed air, spring-loaded catapults, rotating flippers and the like may also be employed. In some examples, an optional angle adjustment mechanism 550 can be attached to the left and right delivery exits to cause pellets to exit with a slight upward or downward trajectory. (This angle adjustment mechanism 550 can also be used with other examples of the disclosure, such as in FIG. 1B.) Other pellets can pass through a third exit hole (not visible in FIG. 5A) and get released from the projector assembly through a projector barrel (not shown in FIG. 5A) using only gravity, similar to the center delivery exit shown in FIG. 1B.

In the example of FIG. 5A, pellet delivery system 500 can dispense three pellets during each delivery cycle. However, in other examples, pellet delivery system 500 can dispense only one or two pellets via any of the projection paths in the projector assembly 506. In some examples, the pellet delivery system 500 can be attached to an airborne carrier such as an unmanned aerial vehicle (UAV) (e.g., quadcopter, helicopter, fixed wing aircraft and the like) or a manned aerial vehicle for delivery of pellets from the air. In these examples, the pellet delivery system 500 can attach to the airborne carrier via hopper assembly 502 (although other attachment mechanisms are contemplated), and chassis 516 can be removed to save weight. In other examples, the pellet delivery system 500 can be attached to terrestrial carriers such as an ATV, truck, motorcycle and the like for delivery of pellets from ground level. In these examples, the pellet delivery system 500 can be attached to the terrestrial carrier via chassis 516 (although other attachment mechanisms are contemplated). In still other examples, the pellet delivery system 500 can be attached to a human or animal using a harness.

Figure 5B:
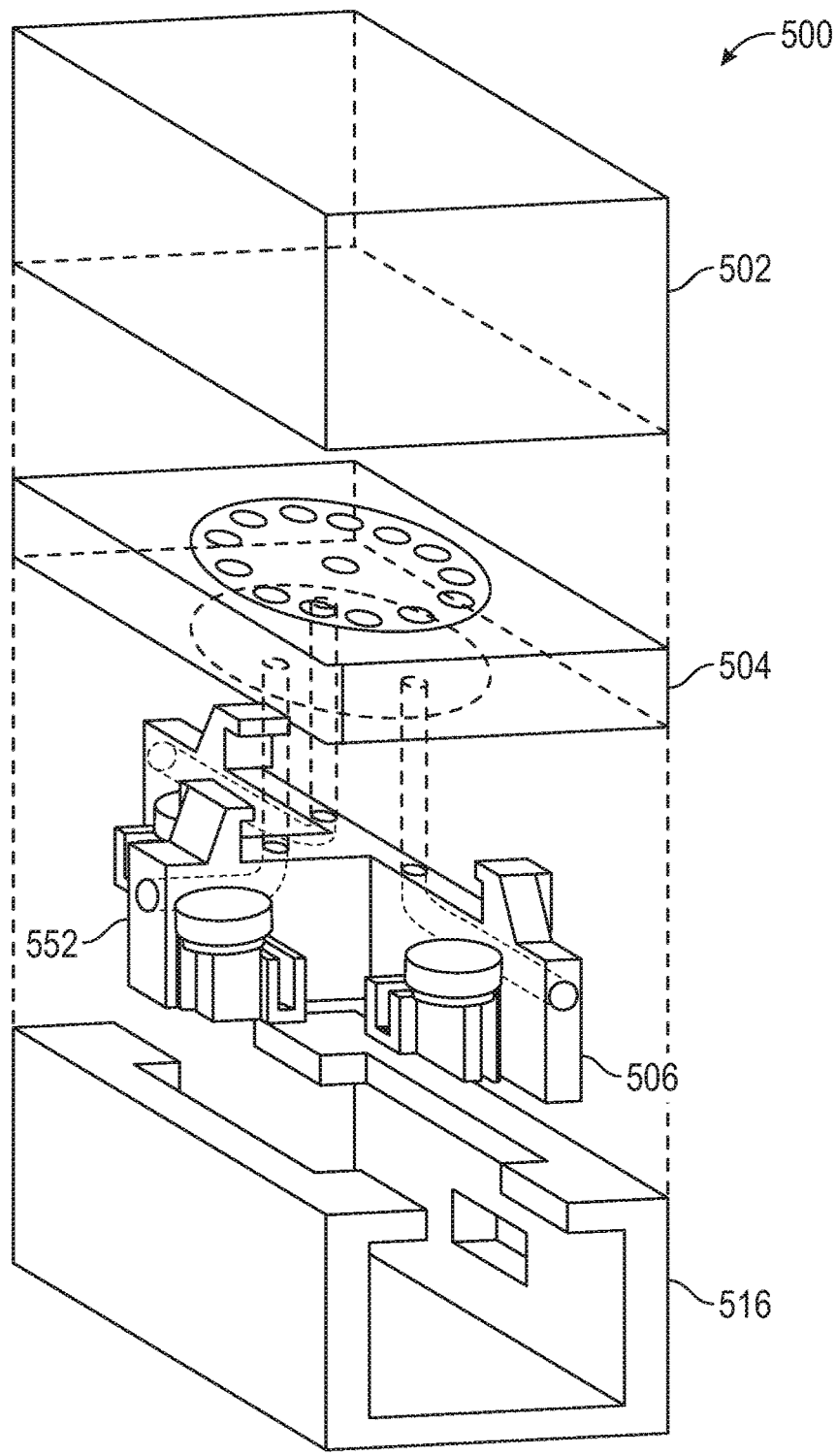
FIG. 5B provides an exploded perspective view of another pellet delivery system according to examples of the disclosure.

FIG. 5B provides an exploded perspective view of another pellet delivery system 500 according to examples of the disclosure. FIG. 5B is similar to FIG. 5A, except that pellets traveling through the center barrel and being ejected via the center delivery exit can also be accelerated using a third projection wheel assembly 552. It should be understood that in general, any number of projection wheel assemblies or similar projection mechanisms can be employed to discharge any number of pellets at any number of orientations, provided that appropriate openings are created in the optional chassis 516.

Figure 5C:
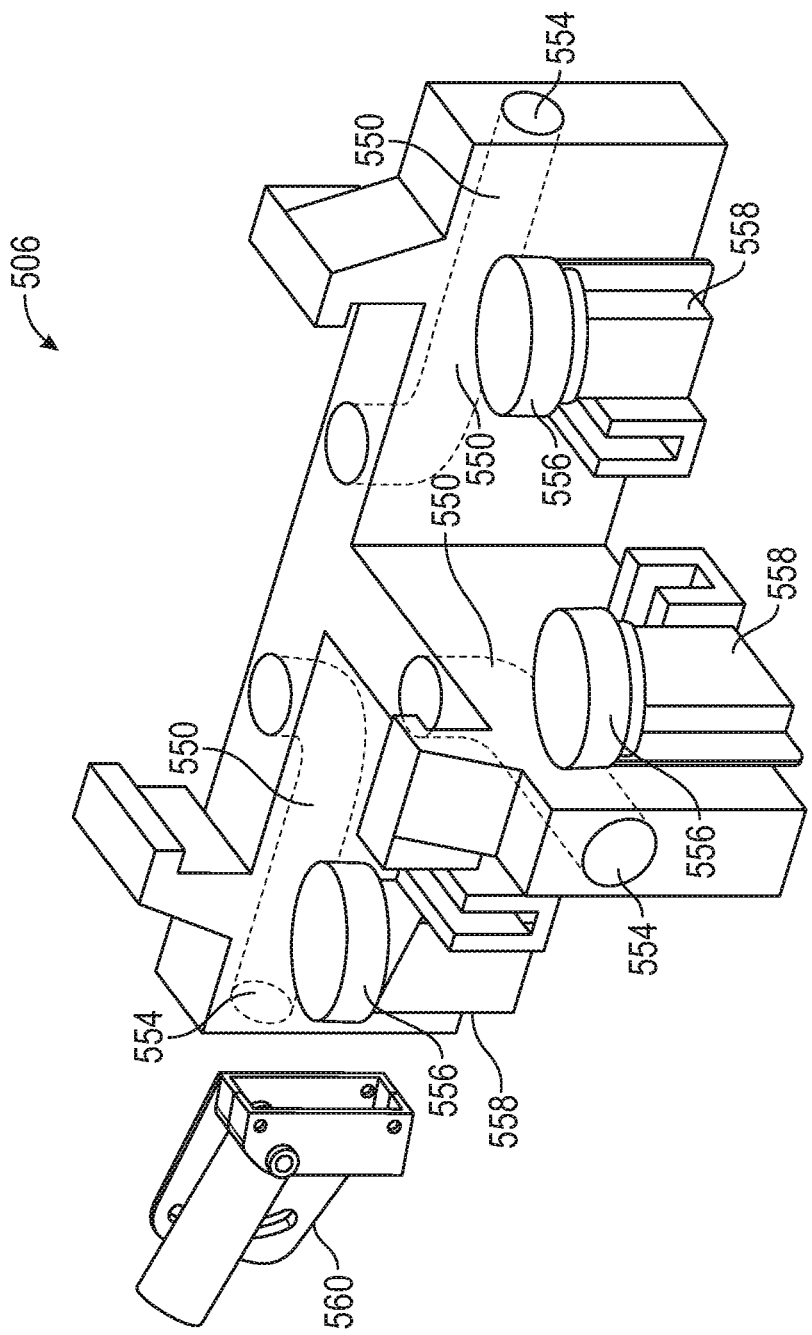
FIG. 5C illustrates the projector assembly of FIG. 5B according to examples of the disclosure.

FIG. 5C illustrates the projector assembly 506 of FIG. 5B according to examples of the disclosure. The projector assembly can include a plurality of delivery exits 554, projection wheels 556, servo motors 558, and projector barrels 550. Each of the delivery exits 554 can be located such that the delivery of the pellets is angularly uniform. In the embodiment shown in FIG. 5C, the three delivery exits 554 are 120 degrees apart, maintaining angular uniformity. The delivery exits 554 can be located on surfaces of the projector assembly that are perpendicular to the bottom surface. An angle adjustment mechanism 560 can be optionally attached to one or more of the side delivery exits 554 such that the pellets can exit at an angle configured by the user.

Figure 6A:
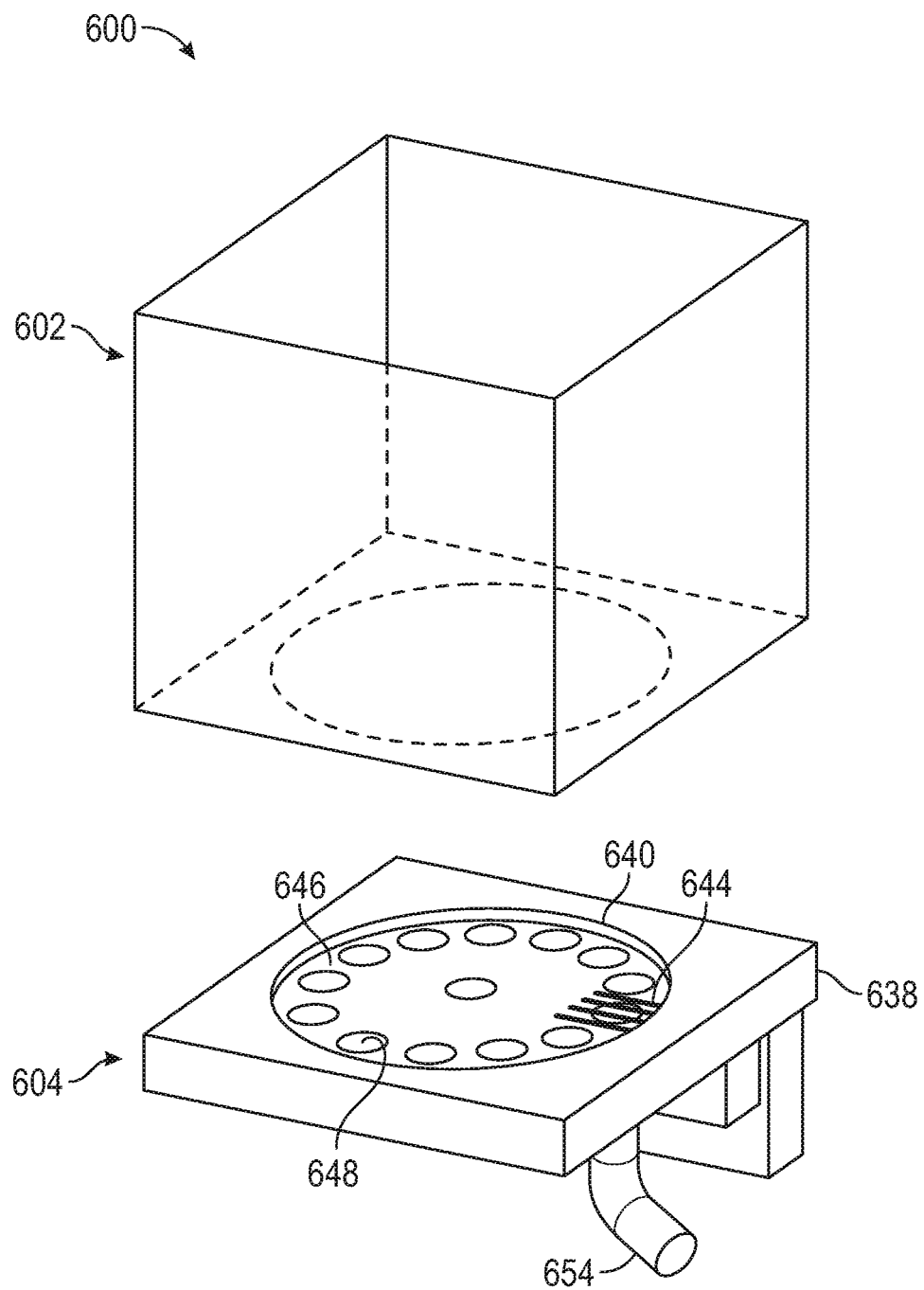
FIG. 6A provides an exploded perspective view of another pellet delivery system according to examples of the disclosure.

FIG. 6A provides an exploded perspective view of another pellet delivery system 600 (i.e., apparatus) according to examples of the disclosure. In the example of FIG. 6A, hopper assembly 602 can be coupled to loading assembly 604. Loading assembly 604 can include loading tray 638 having a cylindrical recess 640 having one exit hole (not shown in FIG. 6A) covered by spring fingers 644. Within recess 640, but below spring fingers 644, is a loading wheel 646. Loading wheel 646 can include a plurality of loading holes 648 which can function as a loading queue. In some examples, loading wheel 646 can be directly driven by a servo motor (not shown in FIG. 6A), although other drive mechanisms can also be employed.

In the example of FIG. 6A, a pellet originally stored in hopper assembly 602 can rest in loading holes 648 and become queued within loading assembly 604. As the loading wheel 646 is rotated by a servo motor, the loading holes will eventually align with the single exit hole located under the spring fingers 644 at the bottom of recess 640, at which time the pellet will exit the loading assembly 604 via the exit hole and exit tube 654. Thus, in the example of FIG. 6A, the exit tube 654 acts as the projector assembly.

The pellet delivery system 600 can be attached to an airborne carrier such as an UAV (e.g., quadcopter, helicopter, fixed wing aircraft and the like) or a manned aerial vehicle for delivery of pellets from the air. In these examples, the pellet delivery system 600 can attach to the airborne carrier via hopper assembly 602 (although other attachment mechanisms are contemplated).

Figure 6B:
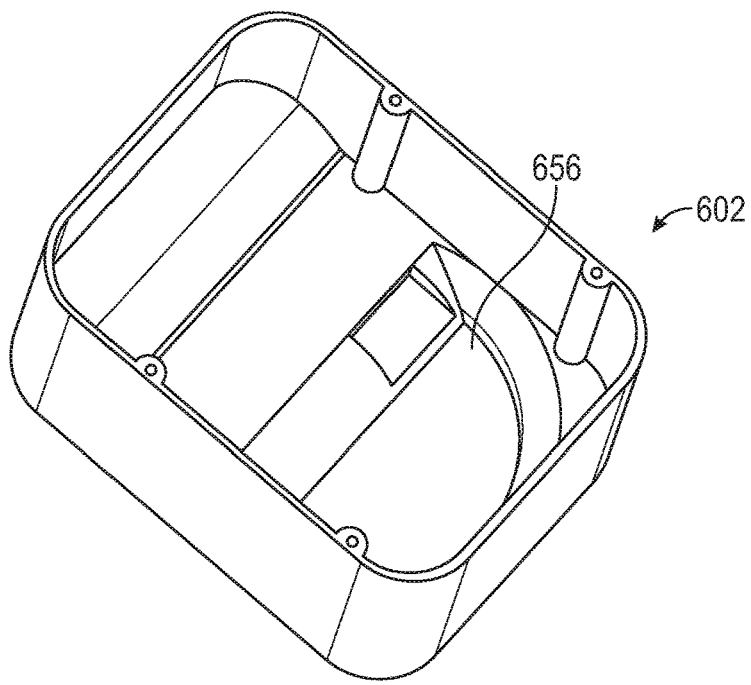
FIG. 6B is a perspective view of a hopper assembly according to examples of the disclosure.

FIG. 6B is a perspective view of a hopper assembly 602 according to examples of the disclosure. In the example of FIG. 6B, hopper assembly can have a half-circle exit aperture 656.

Figure 6C:
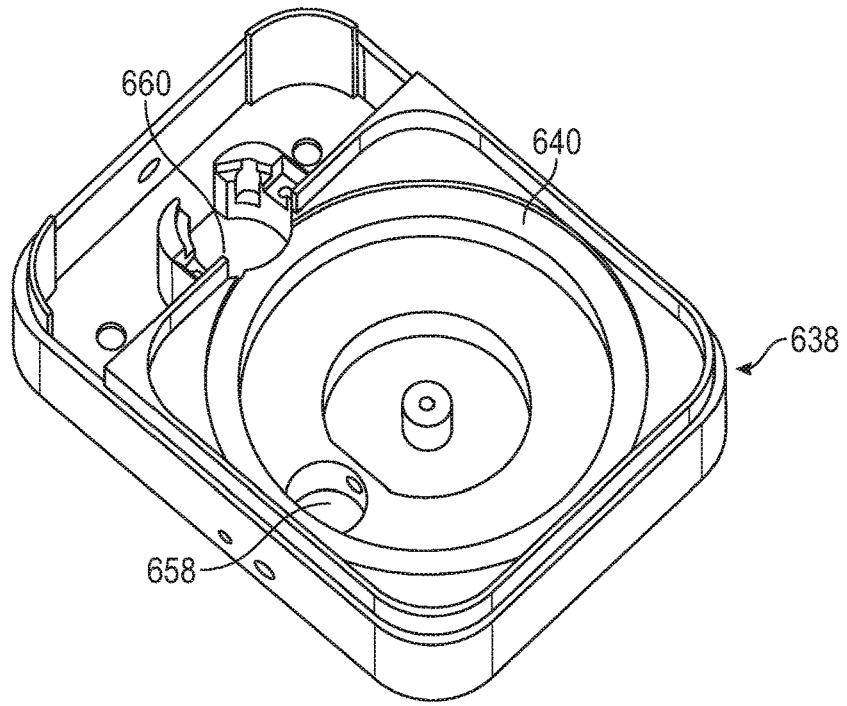
FIG. 6C is a perspective view of a loading tray according to examples of the disclosure.

FIG. 6C is a perspective view of a loading tray 638 according to examples of the disclosure. In the example of FIG. 6C, loading tray 638 includes single exit hole 658, loading wheel recess 640, and drive gear recess 660.

Figure 6D:
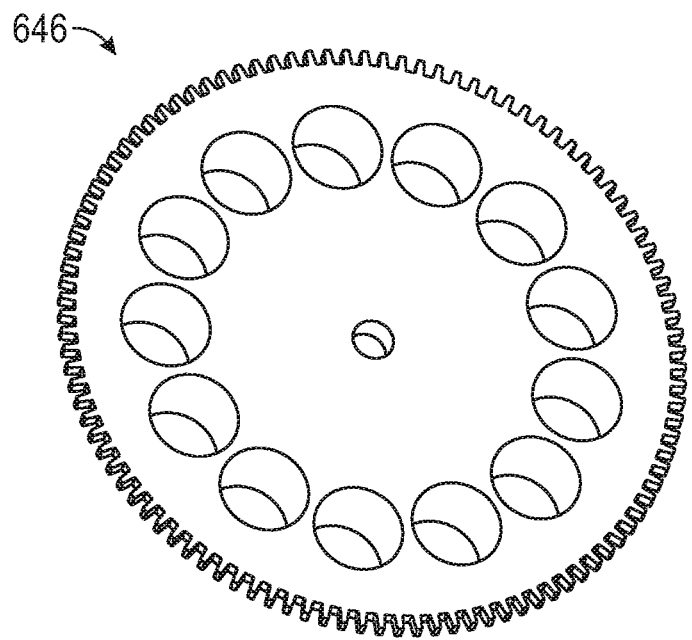
FIG. 6D is a perspective view of a loading wheel according to examples of the disclosure.

FIG. 6D is a perspective view of a loading wheel 646 according to examples of the disclosure. In the example of FIG. 6D, loading wheel 646 is configured for being seated in recess 640, and has teeth for being driven by a drive gear.

Figure 6E:
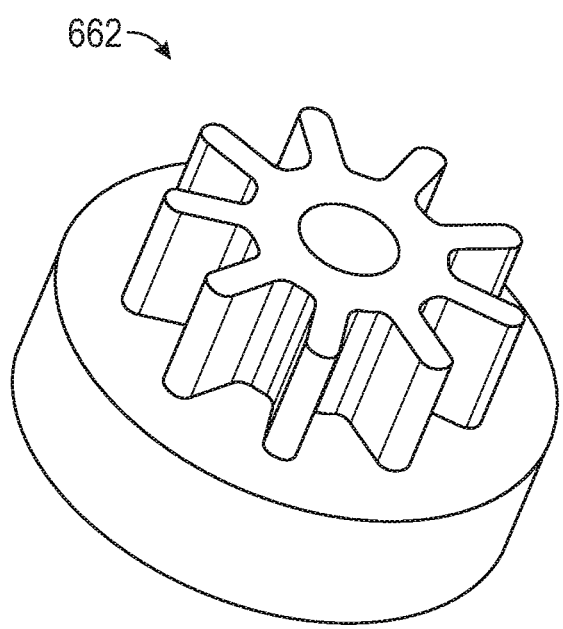
FIG. 6E is a perspective view of a drive gear according to examples of the disclosure.

FIG. 6E is a perspective view of a drive gear 662 according to examples of the disclosure. In the example of FIG. 6E, drive gear 662 is configured for being seated in drive gear recess 660, and has teeth for engagement with loading wheel 646. In operation, drive gear 662 can be rotated by a servo motor, and can rotate loading wheel 646.

As discussed above, in various examples of the disclosure the pellet delivery system can eject three pellets at a time in a linear arrangement (e.g., FIG. 1B; a so-called "triple shooter"), eject a single pellet (e.g., a variation of FIG. 1B; a so-called "single shooter"), or eject any number of pellets at a time in a linear arrangement (e.g., variations of FIG. 1B). In various examples of the disclosure the pellet delivery system can eject three pellets at a time in a nonlinear arrangement (e.g., FIG. 5B). It should be understood, therefore, that various combinations of delivery exits and projection mechanisms can be utilized to produce any number of pellet distribution patterns.

Figure 7A:
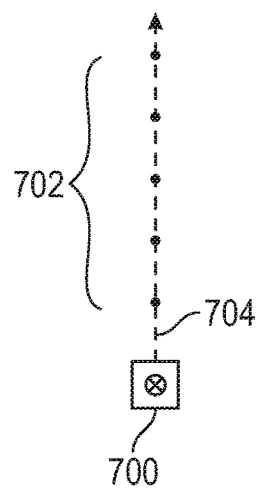
FIGS. 7A-7E illustrate pellet delivery systems in symbolic form and pellet distribution patterns made by those systems when moving along a path (i.e., transect lines) according to examples of the disclosure.
Figure 7B:
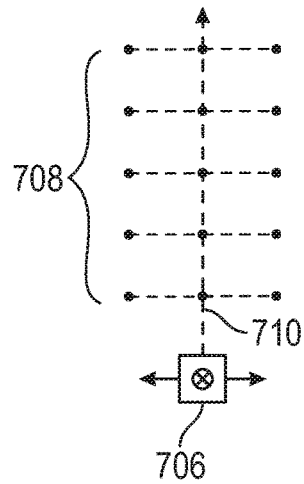
Figure 7C:
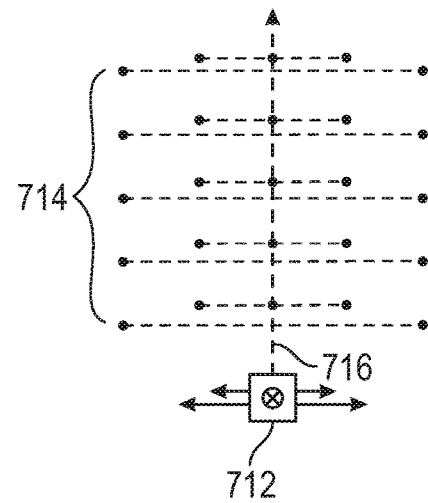
Figure 7D:
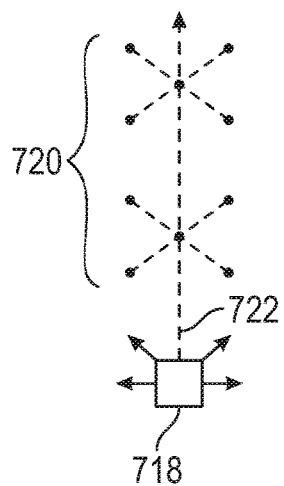
Figure 7E:
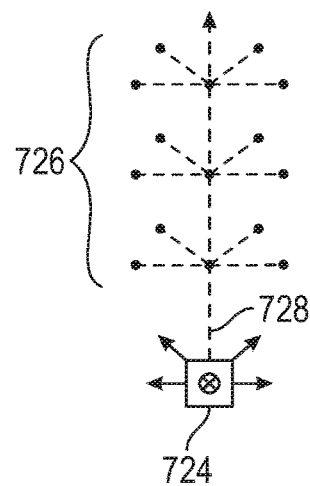

FIGS. 7A-7E illustrate pellet delivery systems in symbolic form and pellet distribution patterns made by those systems when moving along a path (i.e., transect lines) according to examples of the disclosure. In some examples, the pellet delivery system can be designed to generate a particular distribution pattern and achieve a desired dosage rate to maximize the number of individual prairie dogs that are able to find and consume the pellet. FIG. 7A illustrates a single shooter pellet delivery system 700 in symbolic form that can create pellet distribution pattern 702 when moving along path 704 according to examples of the disclosure. FIG. 7B illustrates a triple shooter pellet delivery system 706 in symbolic form that can create pellet distribution pattern 708 when moving along path 710 according to examples of the disclosure. FIG. 7C illustrates a multiple pellet delivery system 712 in symbolic form that can create pellet distribution pattern 714 when moving along path 716 according to examples of the disclosure. FIG. 7D illustrates a multiple pellet delivery system 718 in symbolic form that can create pellet distribution pattern 720 when moving along path 722 according to examples of the disclosure. Although FIG. 7D illustrates only four "shots" on the sides, in other examples even more "shots" can be employed at different angles and/or different shot distances. FIG. 7E illustrates a multiple pellet delivery system 724 in symbolic form that can create pellet distribution pattern 726 when moving along path 728 according to examples of the disclosure. It should be noted that the pellet distribution patterns of FIGS. 7A-7E are simplified and do not account for factors such as the forward motion of the pellet delivery system. It should be further noted that depending on the number, placement and velocity of projectors in the projector assembly, any number of pellet distribution patterns can be created. In some examples, multiple projection mechanisms and gravity drops can be present in a single pellet delivery system, and the projection mechanisms and gravity drops can be turned off or on, or adjusted in orientation, vertical and horizontal launch angle, velocity of pellet delivery and the like to provide a versatile and adaptable system.

FIG. 8A illustrates a method of pellet delivery 800 according to examples of the disclosure. In the example of FIG. 8A, one delivery cycle is executed per predetermined location. For example, a distribution pattern can be programmed in advance, and as the pellet delivery system is determined to be at a particular delivery location, a delivery cycle can be executed. The delivery location can be determined using GPS coordinates, trilateration, and the like. To ensure accurate delivery, in examples of the disclosure where GPS is employed, audio or visual feedback can be provided indicating whether the system has (or has not) locked onto a sufficient number of GPS satellites (e.g., five). In a variation of FIG. 8A, regardless of the location of the previous delivery, the next trigger can be initiated when the pellet delivery system is determined to have moved a predetermined distance from the previous delivery location.

FIG. 8B illustrates another method of pellet delivery 800 according to examples of the disclosure. At block 802, a desired delivery density can be inputted by an operator. The desired delivery density can be applied over a coverage area. At optional block 804, a height can be determined. The height can be defined as a distance between the pellet delivery system and a surface at which the pellet is to be delivered. In some examples, the height can be determined by altimeter or by a GPS system using trilateration. In some examples, because horizontal pellet travel distance is dependent on the height at which a pellet is ejected, the determined height can be used to configure the strength of the projection mechanisms to ensure accurate horizontal pellet travel distances. At block 806, a speed of the pellet delivery system can be determined using an accelerometer or the like. In some examples, the determined speed can be used to configure the strength of the projection mechanisms to account for forward motion. At block 808, in response to the determination of the speed, a time between consecutive delivery locations (i.e., a delivery frequency) can be determined. At block 810, one delivery cycle is executed per predetermined time period. In some examples, the delivery frequency can determine the frequency of the movement of the slide chambers described in this disclosure. Although a specific order of blocks and operations are illustrated in the example of FIG. 8B, a person of ordinary skill in the art would appreciate that different orders of blocks and operations can be performed without departing from the scope of the examples of the disclosure.

Figure 9:
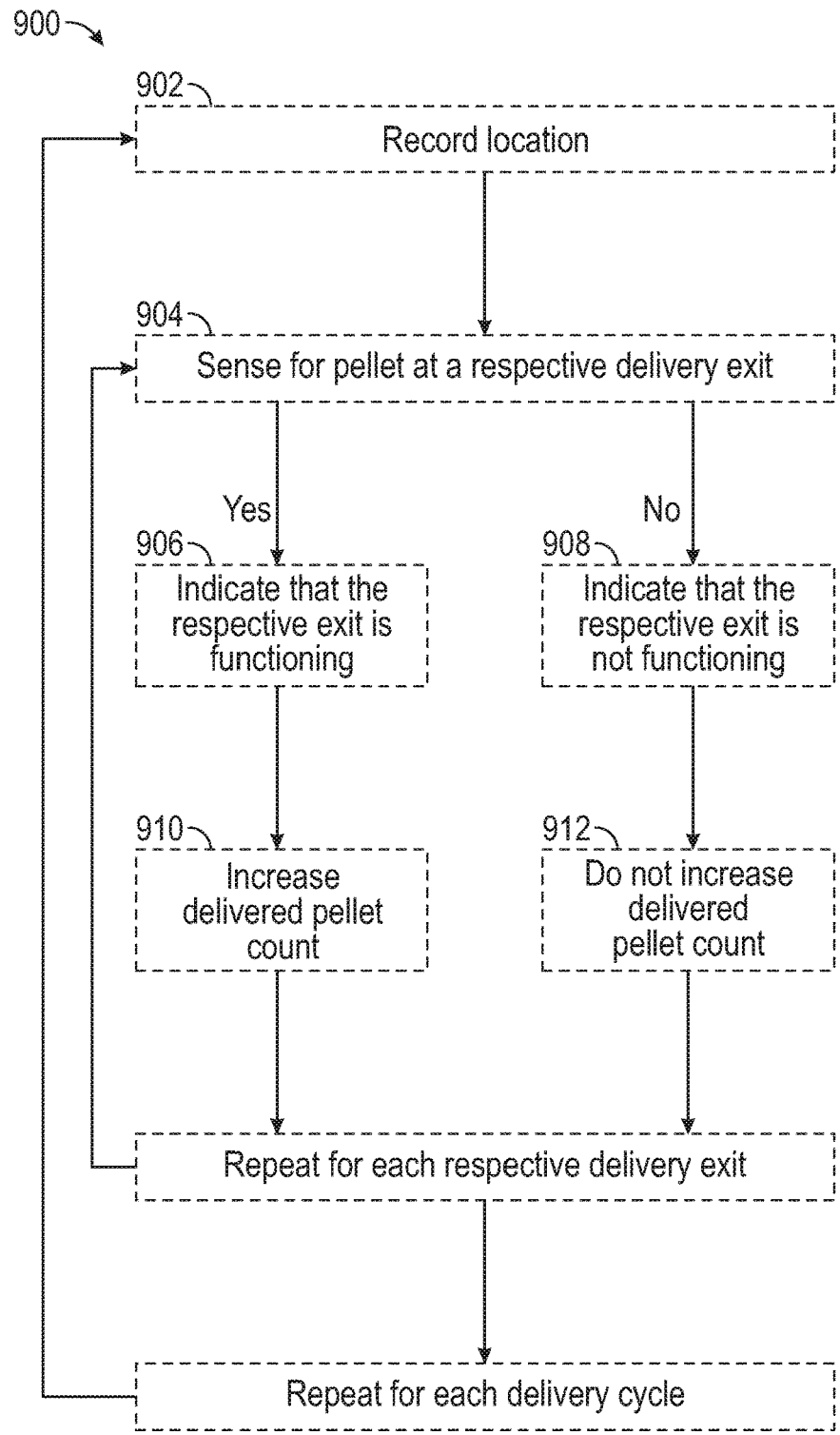
FIG. 9 illustrates a method of pellet delivery tracking according to examples of the disclosure.

FIG. 9 illustrates a method of pellet delivery tracking 900 according to examples of the disclosure. At optional block 902, the location of pellet delivery can be recorded. In optional bock 904, during a delivery cycle, one or more sensors, as described in this disclosure, can determine whether a pellet has passed through a delivery exit. At optional block 906, for each respective delivery exit, in accordance with a determination that a pellet has been sensed, a display (such as the one described in this disclosure or a display on a remote computing system) or other output (e.g., an audible output) can indicate that the pellet delivery system is functioning as intended at the recorded location for the respective delivery exit. At optional bock 910, for each respective delivery exit, in accordance with a determination that the pellet delivery system is functioning as intended, the delivered pellet count can be incremented. At optional block 908, for each respective delivery exit, in accordance with a determination that a pellet has not been sensed, a display or other output can indicate that the pellet delivery system is not functioning as intended at the recorded location for the respective delivery exit. At optional block 912, for each respective delivery exit, in accordance with a determination that the pellet delivery mechanism is not functioning as intended, the delivered pellet count can be maintained. In some examples of the disclosure, the data described above, along with other data such as a track log of the route traveled, can be logged and stored in memory for subsequent downloading (e.g., by connecting to an external computer after mission completion), which can enable an operation to plot exactly when and where pellets were dropped (and not dropped). Optionally, in addition to the pellet tracking method described above, pellets that are being loaded into the slide chamber can be monitored real-time on a display through a camera and/or slide chamber tube described in this disclosure. Although a specific order of blocks and operations are illustrated in the example of FIG. 9, a person of ordinary skill in the art would appreciate that different orders of blocks and operations can be performed without departing from the scope of the examples of the disclosure.

Figure 10:
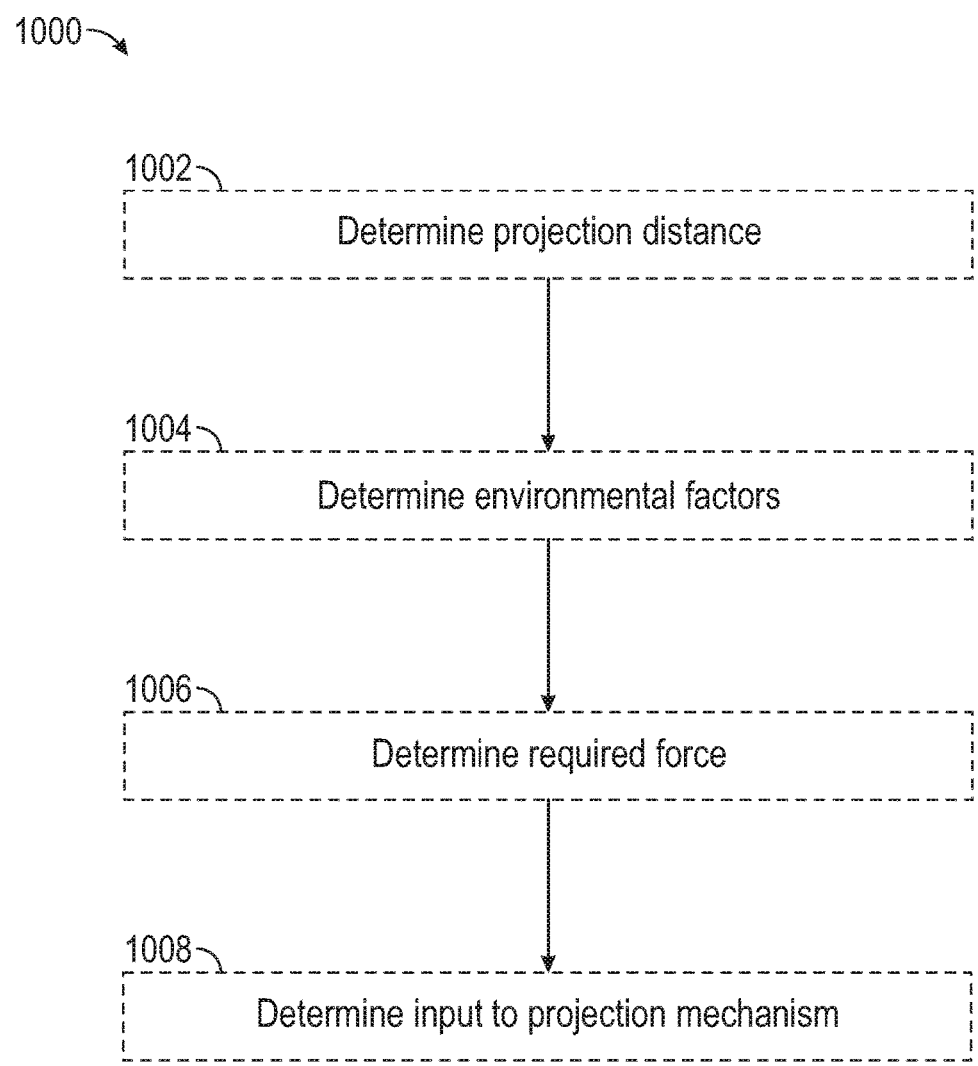
FIG. 10 illustrates a method of adjusting pellet delivery according to examples of the disclosure.

FIG. 10 illustrates a method of adjusting pellet delivery 1000 according to examples of the disclosure. In optional block 1002, a desired projection distance can be determined or retrieved. The desired projection distance can be the distance between the pellet delivery system and a pellet's target. In optional block 1004, environmental factors can be determined. Environmental factors can include the speed and direction of wind, humidity, physical attributes of the pellets, and the like. In optional block 1006, based on the desired projection distance and the environmental factors, a required force can be determined. In optional block 1008, based on the required force, an input to a projection mechanism can be determined. Although a specific order of blocks and operations are illustrated in the example of FIG. 10, a person of ordinary skill in the art would appreciate that different orders of blocks and operations can be performed without departing from the scope of the examples of the disclosure.

Figure 11:
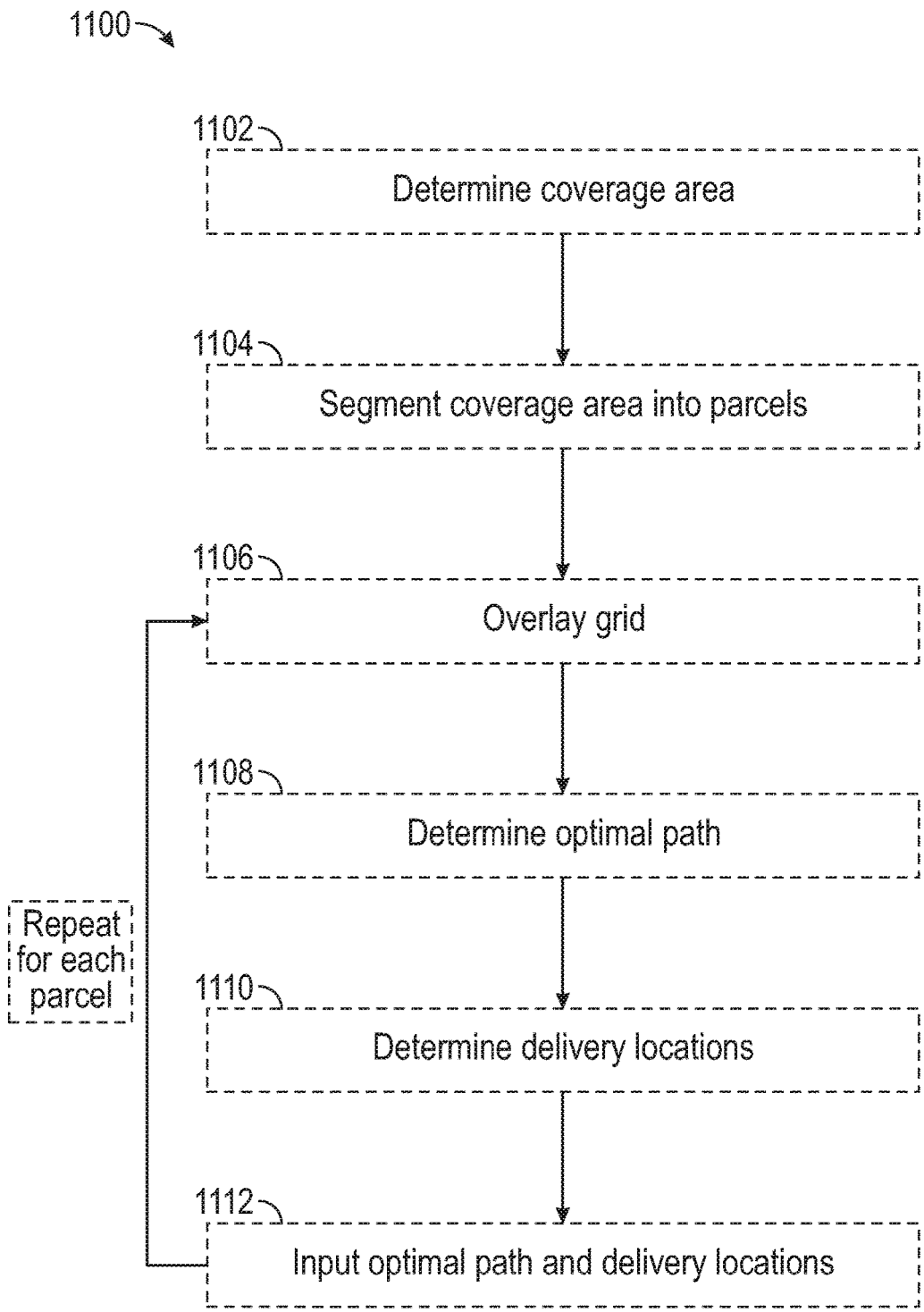
FIG. 11 illustrates a method of efficient pellet delivery according to examples of the disclosure.

FIG. 11 illustrates a method of efficient pellet delivery 1100 according to examples of the disclosure. In block 1102, a coverage area can be determined by the operator. In some examples, the coverage area can correspond to a prairie dog colony, and can be developed using previously mapped and segmented shapefiles depicting prairie dog colony polygons. In block 1104, the coverage area can be segmented into parcels. In some examples, the coverage area can be segmented based on carrier travel time, speed, and travel distance between pellet deliveries. Parcels can be selected with shapes that lend themselves to long, straight travel lines. In block 1106, for each parcel, a grid can be overlaid on top of a map of the parcels. In block 1108, based on a desired delivery density and the grids, an optimal path (i.e., transect lines) that minimizes turns can be determined for each parcel. For example, a combination of Geographic Information System (GIS) and spreadsheet software can be used to generate the files necessary to guide the transportation vehicle or driver (e.g., flight controllers in a UAV, GPS navigation in an ATV, etc.). Transect lines can also be selected based on the expected pellet distribution spread of the particular pellet delivery system being used, and the amount of non-colony area to be traversed. Entrance and exit points for each transect, and the order in which the transects are to be navigated can also be determined. In block 1110, based on the optimal path and travel distance between pellet deliveries, locations of pellet delivery (i.e., waypoints or drop locations) for each transect line and parcel can be determined. In some examples, for each delivery location, the type of triggering (e.g., start-distance based triggering, stop-distance based triggering, etc.) can be determined, such that each waypoint is associated with an order number and a type of drop or trigger action. In block 1112, the optimal path and pellet delivery locations for each parcel can be inputted into the controller described in this disclosure. Steps 1106-1112 can be repeated for each segmented parcel until all optimal paths and pellet delivery locations are determined for the entire coverage area. In some examples, the computed paths can be loaded into the pellet delivery system using a wired or wireless link, and telemetry can also be received via a wired (in terrestrial systems) or wireless links (in airborne systems). With such telemetry, a laptop in the field can track progress of the system through its mission.

Figure 12A:
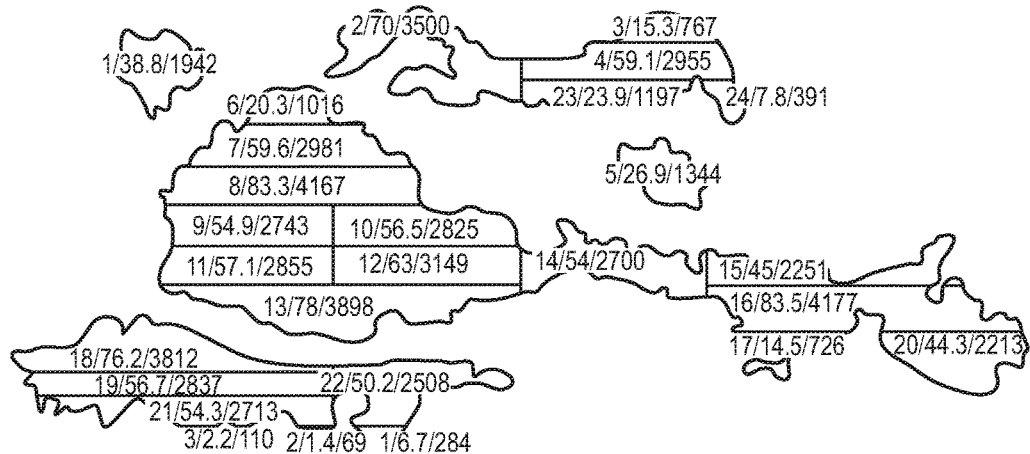
FIG. 12A illustrates a coverage area showing outlines of prairie dog colonies and parcel boundaries that can generated in FIG. 11 according to examples of the disclosure.

FIG. 12A illustrates a coverage area showing outlines of prairie dog colonies and parcel boundaries that can generated in blocks 1102 and 1104 of FIG. 11 according to examples of the disclosure.

Figure 12B:
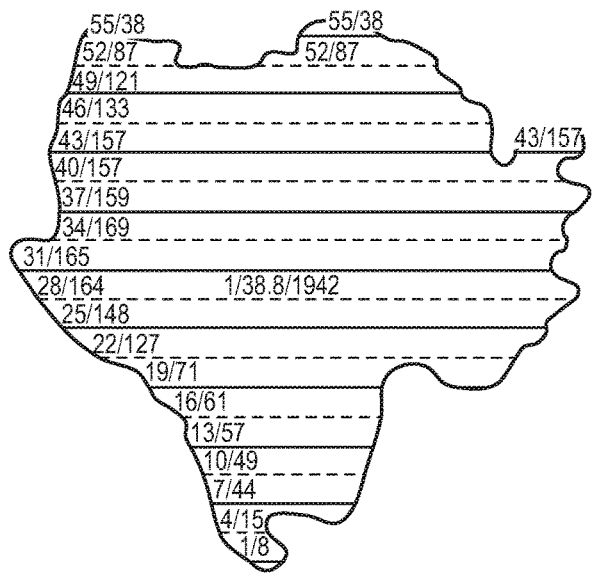
FIG. 12B illustrates a parcel showing transect lines for an all-terrain vehicle (ATV) that can be generated in FIG. 11 according to examples of the disclosure.

FIG. 12B illustrates a parcel showing transect lines for an ATV that can be generated in blocks 1106 and 1108 of FIG. 11 according to examples of the disclosure.

Figure 12C:
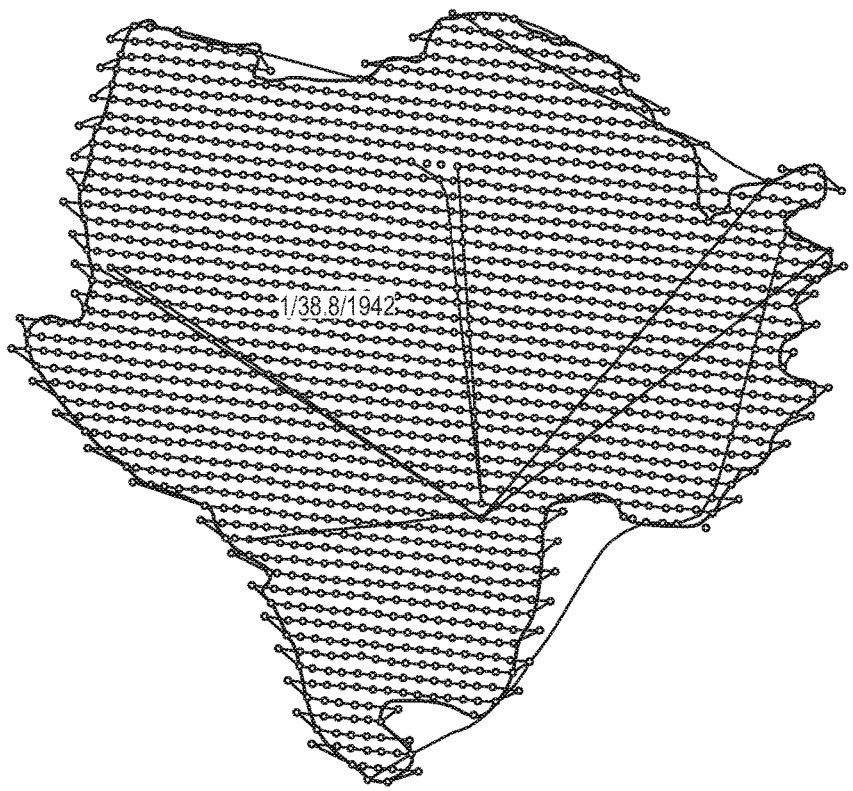
FIG. 12C illustrates a parcel showing flight paths for an unmanned aerial vehicle (UAV) that can be generated in FIG. 11 according to examples of the disclosure.

FIG. 12C illustrates a parcel showing flight paths for a UAV that can be generated in blocks 1106 and 1108 of FIG. 11 according to examples of the disclosure. In the example of FIG. 12C, it can be seen that the UAV must periodically return to the operator/pilot to download data, upload flight plans, re-charge, re-fuel, re-load the hopper assembly, and the like. The dots in the example of FIG. 12C represent computed pellet delivery locations (i.e., trigger locations) as described in FIG. 1110 of FIG. 11. The flight paths and the pellet delivery locations can be inputted into a controller as discussed above.

Figure 12D:
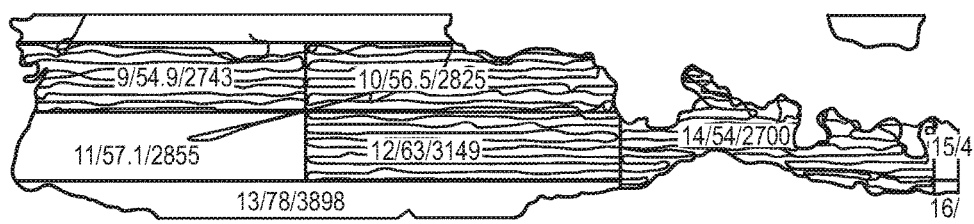
FIG. 12D illustrates a track log of an ATV according to examples of the disclosure.

FIG. 12D illustrates a track log of an ATV according to examples of the disclosure.

Therefore, according to the above, some examples of the disclosure are directed to a pellet delivery apparatus, comprising: a loading assembly configured for arranging a plurality of pellets into one or more loading queues; and a projector assembly coupled to the loading assembly, the projector assembly configured for receiving one or more pellets from the one or more loading queues; wherein the projector assembly is further configured for periodically ejecting at least one pellet at a time in accordance with a predetermined pellet distribution plan. Alternatively or additionally to one or more of the examples disclosed above, in some examples the projector assembly comprises: a plurality of delivery exits configured for ejecting a plurality of pellets at about the same time; and at least one projection mechanism operatively coupled with at least one of the delivery exits, each projection mechanism configured for projecting a pellet out of an operatively coupled delivery exit. Alternatively or additionally to one or more of the examples disclosed above, in some examples each of the at least one projection mechanisms being configurable for projecting the pellet out of the delivery exit at an adjustable velocity in accordance with the predetermined pellet distribution plan. Alternatively or additionally to one or more of the examples disclosed above, in some examples the projector assembly further comprises three delivery exits and two projection mechanisms; wherein each of the two projection mechanisms are configurable for projecting a pellet out of one of the delivery exits at an adjustable velocity; wherein the projector assembly is configured for projecting a pellet out of another delivery exit using gravity; and wherein the three delivery exits and two projection mechanisms are configured for projecting three pellets in different directions in accordance with the predetermined pellet distribution plan. Alternatively or additionally to one or more of the examples disclosed above, in some examples the loading assembly comprises: a housing having one or more horizontally oriented chamber passageways, one or more vertically oriented cylindrical tubes operable as the one or more loading queues and terminating at the one or more chamber passageways, and one or more exit holes at the bottom of the one or more chamber passageways that are offset with respect to the one or more loading queues; and one or more slide chambers configured for moving within the one or more chamber passageways, each slide chamber having a vertically oriented slide hole. Alternatively or additionally to one or more of the examples disclosed above, in some examples the loading assembly further comprising a motor fixedly coupled to the housing and movably coupled to the one or more slide chambers, the motor configurable for sliding the one or more slide chambers within the one or more chamber passageways to allow one or more pellets to exit the loading assembly. Alternatively or additionally to one or more of the examples disclosed above, in some examples the loading assembly comprises: a loading tray having a horizontally oriented cylindrical recess, and one or more exit holes at the bottom of the cylindrical recess; one or more scraper bars coupled to the loading tray and configured for vertically covering the one or more exit holes; and a loading wheel configured for rotating within the cylindrical recess below the one or more scraper bars, the loading wheel including a plurality of cylindrically shaped and vertically oriented loading holes operable as the one or more loading queues. Alternatively or additionally to one or more of the examples disclosed above, in some examples the loading assembly further comprises a motor fixedly coupled to the loading wheel, the motor configurable for rotating the loading wheel within the cylindrical recess to allow one or more pellets to exit the loading assembly. Alternatively or additionally to one or more of the examples disclosed above, in some examples the pellet delivery apparatus further comprises a hopper assembly coupled to the loading assembly and configured for storing a plurality of pellets, the hopper assembly including a stirring mechanism configured for agitating the pellets and pushing them toward the one or more loading queues. Alternatively or additionally to one or more of the examples disclosed above, in some examples the pellet delivery apparatus further comprises a control system communicatively coupled to the loading assembly and the projector assembly, the control system capable of triggering the delivery of pellets according to the predetermined pellet distribution plan. Alternatively or additionally to one or more of the examples disclosed above, in some examples the pellet delivery apparatus is configurable for attachment to either an airborne carrier or a terrestrial carrier.

Some examples of the disclosure are directed to a method of pellet delivery, comprising: arranging a plurality of pellets into one or more loading queues; receiving one or more of the pellets from the one or more loading queues; and periodically ejecting the one or more pellets received from the one or more loading queues at least one pellet at a time in accordance with a predetermined pellet distribution plan. Alternatively or additionally to one or more of the examples disclosed above, in some examples the method further comprises projecting at least one pellet at an adjustable velocity in accordance with the predetermined pellet distribution plan. Alternatively or additionally to one or more of the examples disclosed above, in some examples the method further comprises projecting first and second pellets at an adjustable velocity; and projecting a third pellet using gravity; wherein the first, second and third pellets are projected in different directions in accordance with the predetermined pellet distribution plan. Alternatively or additionally to one or more of the examples disclosed above, in some examples the method further comprises arranging the plurality of pellets into one or more vertically oriented loading queues; and after receiving the one or more pellets from the one or more vertically oriented loading queues, sliding the one or more pellets to an offset exit location in order to eject the one or more pellets. Alternatively or additionally to one or more of the examples disclosed above, in some examples the method further comprises arranging the plurality of pellets into one or more horizontally oriented loading queues, and rotating the one or more horizontally oriented loading queues in order to eject the one or more pellets. Alternatively or additionally to one or more of the examples disclosed above, in some examples the method further comprises storing a plurality of pellets prior to arranging the plurality of pellets into the one or more loading queues; and agitating the stored pellets and pushing them toward the one or more loading queues.

Some examples of the disclosure are directed to a pellet delivery apparatus, comprising: means for arranging a plurality of pellets into one or more loading queues; means for receiving one or more of the pellets from the one or more loading queues; and means for periodically ejecting the one or more pellets received from the one or more loading queues at least one pellet at a time in accordance with a predetermined pellet distribution plan. Alternatively or additionally to one or more of the examples disclosed above, in some examples the pellet delivery apparatus further comprises means for projecting at least one pellet at an adjustable velocity in accordance with the predetermined pellet distribution plan. Alternatively or additionally to one or more of the examples disclosed above, in some examples the pellet delivery apparatus further comprises means for projecting first and second pellets at an adjustable velocity; and means for projecting a third pellet using gravity; wherein the first, second and third pellets are projected in different directions in accordance with the predetermined pellet distribution plan.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A pellet delivery apparatus, comprising:
a loading assembly configured for arranging a plurality of pellets into one or more loading queues; and
a projector assembly coupled to the loading assembly, the projector assembly configured for receiving one or more pellets from the one or more loading queues;
wherein the projector assembly is further configured for periodically ejecting at least one pellet at a time in accordance with a predetermined pellet distribution plan.

2. The pellet delivery apparatus of claim 1, further comprising a hopper assembly coupled to the loading assembly and configured for storing a plurality of pellets, the hopper assembly including a stirring mechanism configured for agitating the pellets and pushing them toward the one or more loading queues.

3. The pellet delivery apparatus of claim 1, further comprising a control system communicatively coupled to the loading assembly and the projector assembly, the control system capable of triggering the delivery of pellets according to the predetermined pellet distribution plan.

4. The pellet delivery apparatus of claim 1, wherein the pellet delivery apparatus is configurable for attachment to either an airborne carrier or a terrestrial carrier.

5. The pellet delivery apparatus of claim 1, the projector assembly comprising:
a plurality of delivery exits configured for ejecting a plurality of pellets at about the same time; and
at least one projection mechanism operatively coupled with at least one of the delivery exits, each projection mechanism configured for projecting a pellet out of an operatively coupled delivery exit.

6. The pellet delivery apparatus of claim 5, each of the at least one projection mechanisms being configurable for projecting the pellet out of the delivery exit at an adjustable velocity in accordance with the predetermined pellet distribution plan.

7. The pellet delivery apparatus of claim 5, the projector assembly further comprising three delivery exits and two projection mechanisms;
wherein each of the two projection mechanisms are configurable for projecting a pellet out of one of the delivery exits at an adjustable velocity;
wherein the projector assembly is configured for projecting a pellet out of another delivery exit using gravity; and
wherein the three delivery exits and two projection mechanisms are configured for projecting three pellets in different directions in accordance with the predetermined pellet distribution plan.

8. The pellet delivery apparatus of claim 1, the loading assembly comprising:
a housing having one or more horizontally oriented chamber passageways, one or more vertically oriented cylindrical tubes operable as the one or more loading queues and terminating at the one or more chamber passageways, and one or more exit holes at the bottom of the one or more chamber passageways that are offset with respect to the one or more loading queues; and one or more slide chambers configured for moving within the one or more chamber passageways, each slide chamber having a vertically oriented slide hole.

9. The pellet delivery apparatus of claim 8, the loading assembly further comprising a motor fixedly coupled to the housing and movably coupled to the one or more slide chambers, the motor configurable for sliding the one or more slide chambers within the one or more chamber passageways to allow one or more pellets to exit the loading assembly.

10. The pellet delivery apparatus of claim 1, the loading assembly comprising:

a loading tray having a horizontally oriented cylindrical recess, and one or more exit holes at the bottom of the cylindrical recess;

one or more scraper bars coupled to the loading tray and configured for vertically covering the one or more exit holes; and a loading wheel configured for rotating within the cylindrical recess below the one or more scraper bars, the loading wheel including a plurality of cylindrically shaped and vertically oriented loading holes operable as the one or more loading queues.

11. The pellet delivery apparatus of claim 10, the loading assembly further comprising a motor fixedly coupled to the loading wheel, the motor configurable for rotating the loading wheel within the cylindrical recess to allow one or more pellets to exit the loading assembly.

12. A method of pellet delivery, comprising:

arranging a plurality of pellets into one or more loading queues;

receiving one or more of the pellets from the one or more loading queues; and periodically ejecting the one or more pellets received from the one or more loading queues at least one pellet at a time in accordance with a predetermined pellet distribution plan.

13. The method of claim 12, further comprising:

arranging the plurality of pellets into one or more vertically oriented loading queues; and after receiving the one or more pellets from the one or more vertically oriented loading queues, sliding the one or more pellets to an offset exit location in order to eject the one or more pellets.

14. The method of claim 12, further comprising:

arranging the plurality of pellets into one or more horizontally oriented loading queues, and rotating the one or more horizontally oriented loading queues in order to eject the one or more pellets.

15. The method of claim 12, further comprising:

storing a plurality of pellets prior to arranging the plurality of pellets into the one or more loading queues; and agitating the stored pellets and pushing them toward the one or more loading queues.

16. The method of claim 12, further comprising projecting at least one pellet at an adjustable velocity in accordance with the predetermined pellet distribution plan.

17. The method of claim 16, further comprising:

projecting first and second pellets at an adjustable velocity; and projecting a third pellet using gravity;

wherein the first, second and third pellets are projected in different directions in accordance with the predetermined pellet distribution plan.

18. A pellet delivery apparatus, comprising:

means for arranging a plurality of pellets into one or more loading queues;

means for receiving one or more of the pellets from the one or more loading queues; and means for periodically ejecting the one or more pellets received from the one or more loading queues at least one pellet at a time in accordance with a predetermined pellet distribution plan.

19. The pellet delivery apparatus of claim 18, further comprising means for projecting at least one pellet at an adjustable velocity in accordance with the predetermined pellet distribution plan.

20. The pellet delivery apparatus of claim 19, further comprising:

means for projecting first and second pellets at an adjustable velocity; and means for projecting a third pellet using gravity;

wherein the first, second and third pellets are projected in different directions in accordance with the predetermined pellet distribution plan.

* * * * *